United States Patent
Sun et al.

(10) Patent No.: US 11,349,606 B2
(45) Date of Patent: May 31, 2022

(54) METHOD AND APPARATUS FOR DOWNLINK RETRANSMISSION UNDER UNRELIABLE CODE BLOCK GROUP (CBG) LEVEL FEEDBACK

(71) Applicant: QUALCOMM Incorporated, San Diego, CA (US)

(72) Inventors: Jing Sun, San Diego, CA (US); Yang Yang, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 16/885,774

(22) Filed: May 28, 2020

(65) Prior Publication Data

US 2020/0295875 A1 Sep. 17, 2020

Related U.S. Application Data

(62) Division of application No. 16/020,862, filed on Jun. 27, 2018, now Pat. No. 10,707,995.
(Continued)

(51) Int. Cl.
*G06F 11/00* (2006.01)
*H04L 1/00* (2006.01)
(Continued)

(52) U.S. Cl.
CPC .......... *H04L 1/0061* (2013.01); *H04L 1/0013* (2013.01); *H04L 1/0064* (2013.01);
(Continued)

(58) Field of Classification Search
USPC ....... 370/216, 235, 236, 241, 242, 252, 328, 370/330, 345, 410, 426, 458, 468;
(Continued)

(56) References Cited

U.S. PATENT DOCUMENTS 10,389,481 B2 * 8/2019 Ren ................ H04L 1/0045
10,469,139 B2    11/2019 Wei et al.
(Continued)

FOREIGN PATENT DOCUMENTS

CN    106888074 A    6/2017

OTHER PUBLICATIONS

Qualcomm Incorporated: "DCI Considerations for CBG-based (re)-Transmissions," 3GPP TSG RAN WG1 NR#2, Jun. 27-30, 2017, R1-1711203 (Year: 2017).*
(Continued)

*Primary Examiner* — Nguyen H Ngo
(74) *Attorney, Agent, or Firm* — Kevin T. Cheatham

(57) ABSTRACT

Aspects of the present disclosure relate to techniques for retransmission of code block groups when code block group (CBG) level feedback is unreliable. A user equipment (UE), in a first slot, transmits a first CBG feedback corresponding to a first set of CBGs received from a base station. In a second slot after the first slot, the UE receives downlink control information (DCI) and a first cyclic redundancy check (CRC). The first CRC is generated based on the DCI and further scrambled by a first concatenation of CBG feedbacks as decoded by the base station. The UE generates a second CRC based on the DCI and further scrambled by a second concatenation of CBG feedbacks including the first CBG feedback. The UE determines that the base station correctly decoded the first CBG feedback based on a comparison of the first CRC and the second CRC.

10 Claims, 21 Drawing Sheets

Related U.S. Application Data

(60) Provisional application No. 62/527,005, filed on Jun. 29, 2017.

(51) Int. Cl.

| | |
|---|---|
| *H04L 1/18* | (2006.01) |
| *H04L 1/16* | (2006.01) |
| *H04L 5/00* | (2006.01) |
| *H04W 72/04* | (2009.01) |

(52) U.S. Cl.
CPC .......... *H04L 1/0072* (2013.01); *H04L 1/1614* (2013.01); *H04L 1/1671* (2013.01); *H04L 1/1812* (2013.01); *H04L 1/1896* (2013.01); *H04L 5/0044* (2013.01); *H04L 5/0053* (2013.01); *H04W 72/042* (2013.01); *H04L 5/0055* (2013.01)

(58) Field of Classification Search
USPC ................ 714/699, 746, 747, 748, 749, 750
See application file for complete search history.

(56) References Cited

U.S. PATENT DOCUMENTS

| | | | |
|---|---|---|---|
| 10,707,995 | B2 | 7/2020 | Sun et al. |
| 2009/0154412 | A1 | 6/2009 | Wang et al. |
| 2010/0011273 | A1 | 1/2010 | Parolari |
| 2012/0039279 | A1 | 2/2012 | Chen et al. |
| 2016/0029395 | A1 | 1/2016 | Kim et al. |
| 2017/0353273 | A1 | 12/2017 | Zhang et al. |
| 2018/0278379 | A1 | 9/2018 | Sun et al. |
| 2018/0317213 | A1 | 11/2018 | Islam et al. |
| 2018/0332568 | A1 | 11/2018 | Wu et al. |
| 2019/0007170 | A1 | 1/2019 | Sun et al. |
| 2019/0020445 | A1* | 1/2019 | Kim ...................... H04L 1/0071 |

OTHER PUBLICATIONS

CATT: "DL Control Signaling Design for CBG-based Operation," 3GPP Draft; R1-1710096, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017, Jun. 26, 2017, XP051299320, 4 pages, Retrieved from the Internet: URL: http://www.3gpp.org/ftp/Meetings_3GPP_SYNC/RAN1/Docs/ [retrieved on Jun. 26, 2017].

Huawei, et al., "Scheduling Mechanisms for CBG-based Retransmission", 3GPP Draft; R1-1706962, vol. RAN WG1, No. Hangzhou, China; May 15, 2017-May 19, 2017, May 14, 2017 (May 14, 2017), 3 Pages, XP051272192, Retrieved from the Internet: URL: http://www.3gpp.org/ftp/Meetings_3GPP_SYNC/RAN1/Docs/ [retrieved on May 14, 2017].

International Search Report and Written Opinion—PCT/US2018/040097—ISA/EPO—dated Oct. 10, 2018.

Qualcomm Incorporated: "DCI Considerations for CBG-based (re)-Transmissions," 3GPP TSG RAN WG1 NR#2 Draft; R1-1711203-CBG-DCI-Reduction, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017, XP051300402, 5 pages, Retrieved from the Internet: URL: http://www.3gpp.org/ftp/Meetings_3GPP_SYNC/RAN1/Docs/ [retrieved on Jun. 26, 2017].

Samsung: "Scheduling for CBG-based Retransmissions," 3GPP Draft; R1-1710726, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017, XP051299931, 8 pages, Retrieved from the Internet: URL: http://www.3gpp.org/ftp/Meetings_3GPP_SYNC/RAN1/Docs/ [retrieved on Jun. 26, 2017].

\* cited by examiner

METHOD AND APPARATUS FOR DOWNLINK RETRANSMISSION UNDER UNRELIABLE CODE BLOCK GROUP (CBG) LEVEL FEEDBACK

PRIORITY CLAIM

The present application for patent is a Divisional of patent application Ser. No. 16/020,862 entitled "METHOD AND APPARATUS FOR DOWNLINK RETRANSMISSION UNDER UNRELIABLE CODE BLOCK GROUP (CBG) LEVEL FEEDBACK" filed Jun. 27, 2018, which claims priority to and the benefit of U.S. Provisional Patent Application No. 62/527,005 entitled "METHOD AND APPARATUS FOR DOWNLINK RETRANSMISSION UNDER UNRELIABLE CODE BLOCK GROUP (CBG) LEVEL FEEDBACK" filed on Jun. 29, 2017, pending and assigned to the assignee hereof and hereby expressly incorporated by reference herein.

TECHNICAL FIELD

The technology discussed below relates generally to wireless communication systems, and more particularly, to techniques for downlink retransmission of code block groups (CBGs) when code block group-level acknowledgement feedback is unreliable.

INTRODUCTION

An emerging telecommunication standard is 5G new radio (NR). NR is a set of enhancements to the current LTE mobile standard promulgated by Third Generation Partnership Project (3GPP). It is designed to better support mobile broadband Internet access by improving spectral efficiency, lowering costs, improving services, making use of new spectrum, and better integrating with other open standards using orthogonal frequency-division multiple access (OFDMA) with a cyclic prefix (CP) on the downlink (DL) and on the uplink (UL) as well as support beamforming, multiple-input multiple-output (MIMO) antenna technology, and carrier aggregation.

In NR networks, a transport block may be transmitted as code block groups, and a user equipment (UE) may acknowledge each code block group (CBG) separately using CBG level feedback. However, CBG level feedback may not be always reliable. It is desirable to improve CBG level feedback in 5G NR and other networks.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method for wireless communication operable at a user equipment (UE). The UE, in a first slot, transmits a first code block group (CBG) feedback corresponding to a first set of code block groups (CBGs) received from a base station (BS). The UE, in a second slot after the first slot, receives downlink control information (DCI) and a first cyclic redundancy check (CRC). The first CRC is generated based on the DCI and further scrambled by a first concatenation of CBG feedbacks as decoded by the BS. The UE generates a second CRC based on the DCI and further scrambled by a second concatenation of CBG feedbacks including the first CBG feedback. The UE determines that the BS correctly decoded the first CBG feedback based on a comparison of the first CRC and the second CRC.

Another aspect of the present disclosure provides a method for wireless communication operable at a scheduling entity. The scheduling entity transmits, in a first slot, a first set of code block groups (CBGs) to a user equipment (UE). The scheduling entity receives, in the first slot, a first code block group (CBG) feedback corresponding to the first set of CBGs. The scheduling entity transmits, in a second slot, first downlink control information (DCI) and a first cyclic redundancy check (CRC). The first CRC is generated based on the first DCI and further scrambled by a first sequence based on a concatenation of the first CBG feedback and a previous CBG feedback corresponding to a set of CBGs received from the UE in a slot prior to the first slot.

Another aspect of the present disclosure provides a user equipment (UE). The UE includes a communication interface configured for wireless communication, a memory, and a processor operatively coupled with the communication interface and the memory. The processor and the memory are configured to, in a first slot, transmit a first code block group (CBG) feedback corresponding to a first set of code block groups (CBGs) received from a base station (BS). The processor and the memory are further configured to, in a second slot after the first slot, receive downlink control information (DCI) and a first cyclic redundancy check (CRC). The first CRC is generated based on the DCI and further scrambled by a first concatenation of CBG feedbacks as decoded by the BS. The processor and the memory are further configured to generate a second CRC based on the DCI and further scrambled by a second concatenation of CBG feedbacks including the first CBG feedback. The processor and the memory are further configured to determine that the BS correctly decoded the first CBG feedback based on a comparison of the first CRC and the second CRC.

Another aspect of the present disclosure provides a scheduling entity. The scheduling entity includes a communication interface configured for wireless communication, a memory, and a processor operatively coupled with the communication interface and the memory. The processor and the memory are configured to transmit, in a first slot, a first set of code block groups (CBGs) to a user equipment (UE). The processor and the memory are further configured to receive, in the first slot, a first code block group (CBG) feedback corresponding to the first set of CBGs. The processor and the memory are further configured to transmit, in a second slot, first downlink control information (DCI) and a first cyclic redundancy check (CRC). The first CRC is generated based on the first DCI and further scrambled by a first sequence based on a concatenation of the first CBG feedback and a previous CBG feedback corresponding to a set of CBGs received from the UE in a slot prior to the first slot.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
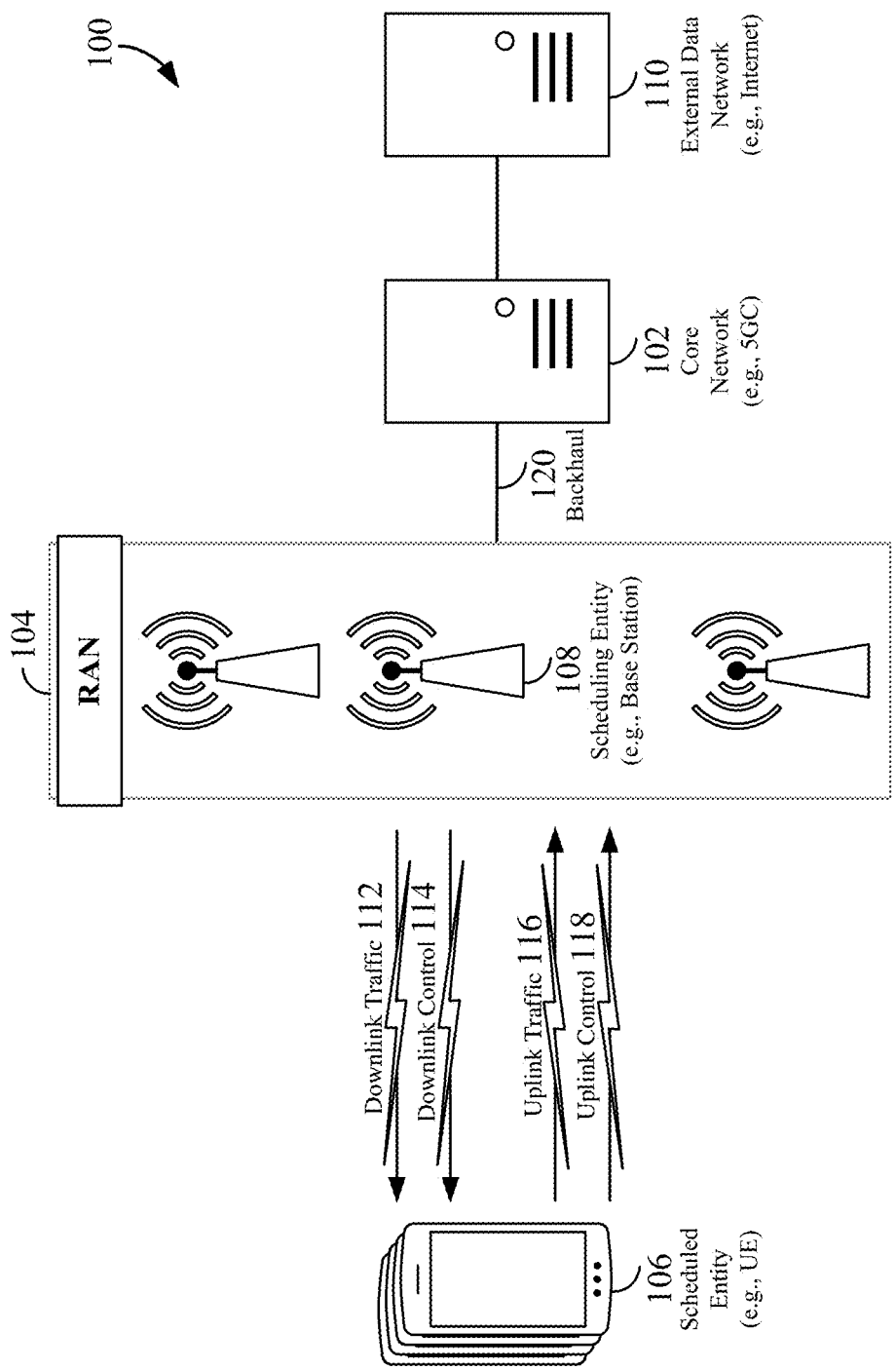
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure may be used for new radio (NR) (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 60 GHz), massive machine-type communication (mMTC) targeting non-backward compatible MTC techniques, and/or mission critical targeting ultra reliable low latency communications (URLLC). These services may have different latency and reliability requirements. These services may also have different transmission time intervals (TTI) to meet respective quality of service (QoS) requirements. In addition, these services may coexist in the same slot.

In NR networks, a user equipment (UE) may acknowledge a downlink transmission using code block group (CBG) level feedback. Certain aspects of the present disclosure provide techniques for retransmission of CBGs when CBG level feedback is unreliable.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
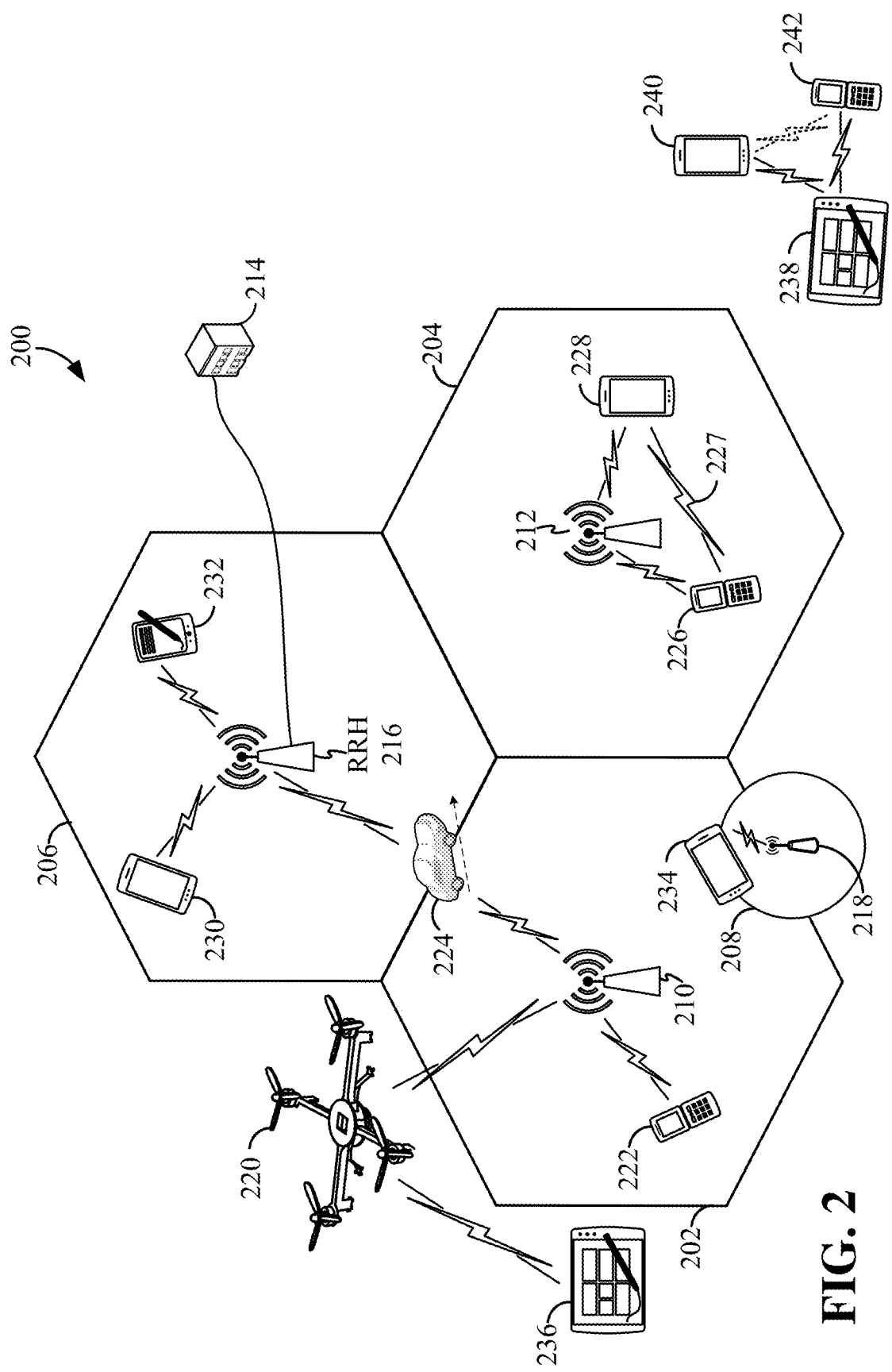
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF)

that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise. For example, a transport block (TB) may include a plurality of CBs grouped into code block groups (CBGs).

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In a DL transmission, a transmitting device (e.g., the scheduling entity 108) may allocate one or more resource elements (REs) (e.g., within a control region of a slot) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgement (ACK) or negative acknowledgement (NACK). HARQ is a technique that allows a receiver to check the integrity of packet transmissions for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, a transmitting device (e.g., the scheduled entity 106) may utilize one or more REs to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs (e.g., within a data region or a slot) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs within the data region may be configured to carry system information blocks (SIBs), carrying information that may enable access to a given cell.

The channels or carriers described above and illustrated in FIG. 1 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 3:
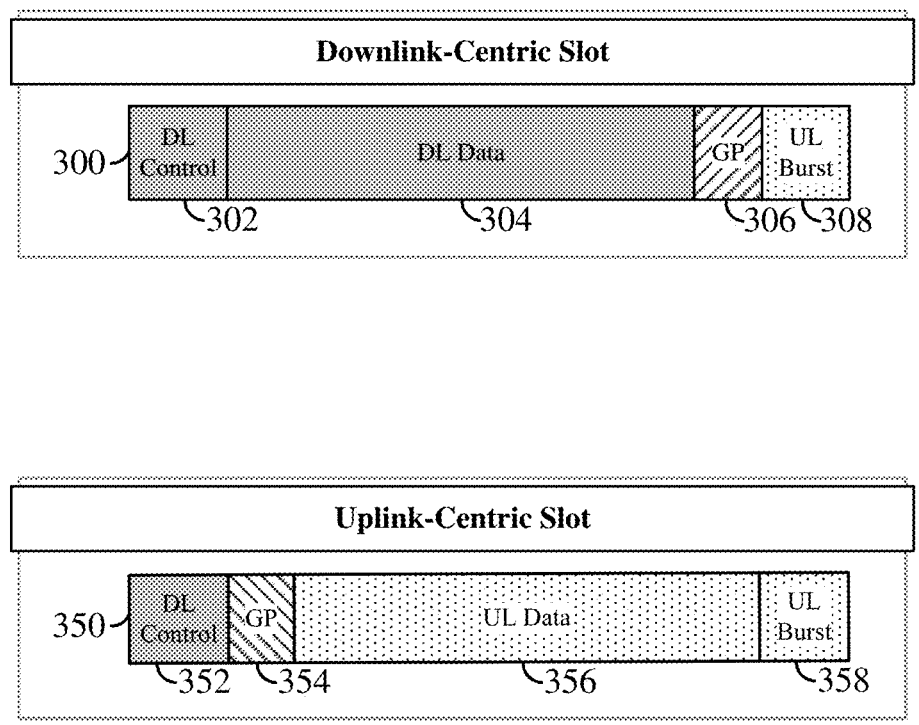
FIG. 3 is a schematic illustration of exemplary self-contained slots according to some aspects of the disclosure.

According to an aspect of the disclosure, one or more slots may be structured as self-contained slots. For example, FIG. 3 illustrates two example structures of self-contained slots 300 and 350. The self-contained slots 300 and/or 350 may be used, in some examples, for the communication between the scheduling entity 108 and scheduled entity 106.

In the illustrated example, a DL-centric slot 300 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 350 may be a receiver-scheduled slot, wherein more resources are allocated for transmissions in the UL direction (e.g., transmissions from the scheduled entity 106 to the scheduling entity 108).

Each slot, such as the self-contained slots 300 and 350, may include transmit (Tx) and receive (Rx) portions. For example, in the DL-centric slot 300, the scheduling entity 108 first has an opportunity to transmit control information, e.g., on a PDCCH, in a DL control region 302, and then an opportunity to transmit DL user data or traffic, e.g., on a PDSCH in a DL data region 304. Following a guard period (GP) region 306 having a suitable duration 310, the scheduling entity 108 has an opportunity to receive UL data and/or UL feedback including any UL scheduling requests, CSF, a HARQ ACK/NACK, etc., in an UL burst 308 from other entities using the carrier. Here, a slot such as the DL-centric slot 300 may be referred to as a self-contained slot when all of the data carried in the data region 304 is scheduled in the control region 302 of the same slot; and further, when all of the data carried in the data region 304 is acknowledged (or at least has an opportunity to be acknowledged) in the UL burst 308 of the same slot. In this way, each self-contained slot may be considered a self-contained entity, not necessarily requiring any other slot to complete a scheduling-transmission-acknowledgment cycle for any given packet. The self-contained slot may be called a self-contained slot in this disclosure.

Similarly, the UL-centric slot 350 may be configured as a self-contained slot. The UL-centric slot 350 is substantially similar to the DL-centric slot 300, including a guard period 354, an UL data region 356, and an UL burst region 358.

The slot structure illustrated in slots 300 and 350 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Figure 4:
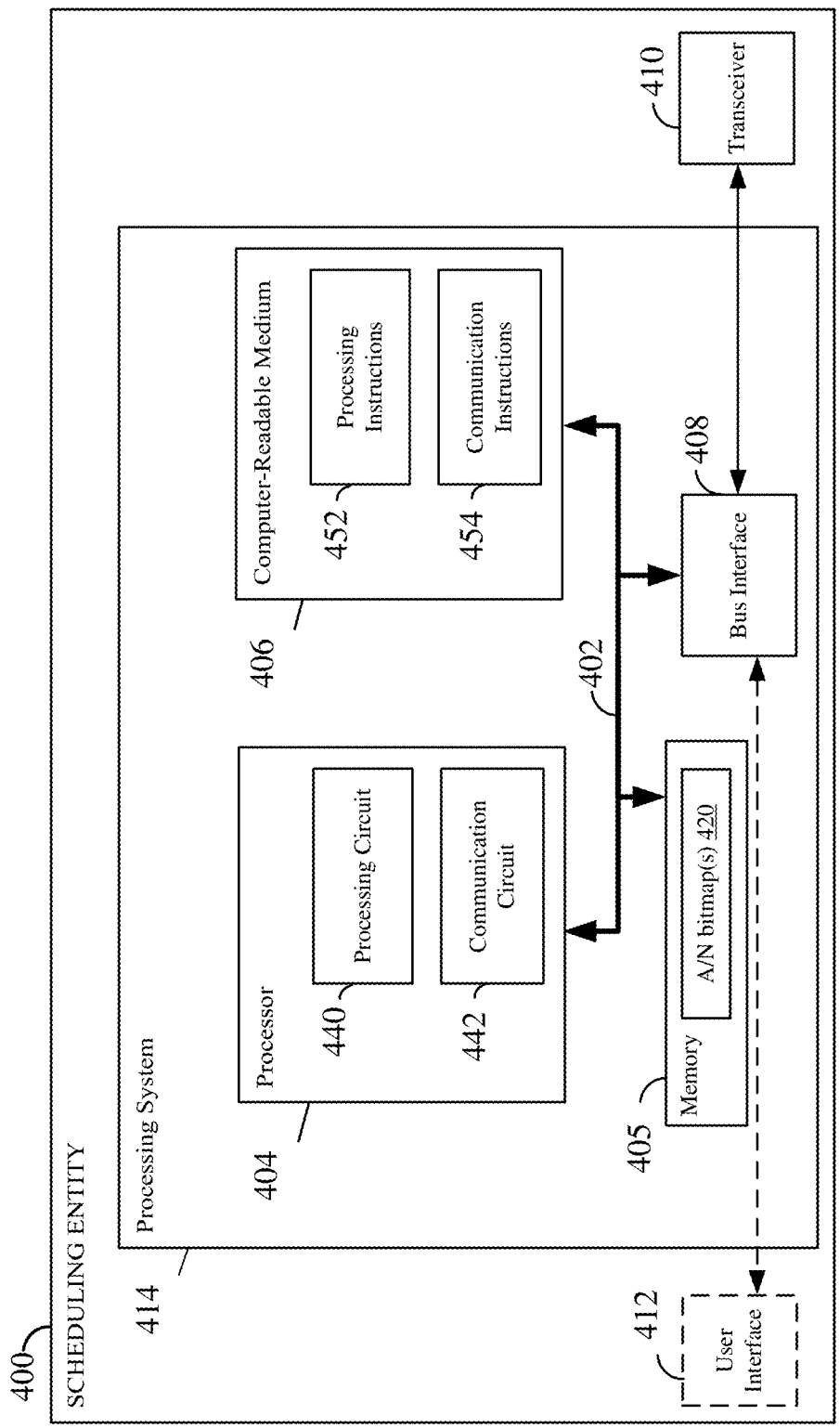
FIG. 4 is a block diagram conceptually illustrating an example of a hardware implementation for a scheduling entity according to some aspects of the disclosure.

FIG. 4 is a block diagram illustrating an example of a hardware implementation for a scheduling entity 400 employing a processing system 414. For example, the scheduling entity 400 may be a user equipment (UE) as illustrated in any one or more of FIGS. 1, 2, 9, and/or 10. In another example, the scheduling entity 400 may be a base station as illustrated in any one or more of FIGS. 1, 2, 9, and/or 10.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described below and illustrated in FIGS. 7-21.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include circuitry configured for various functions, including, for example, a processing circuit 440 and a communication circuit 442. For example, the circuitry may be configured to implement one or more of the functions described below in relation to FIGS. 7-21.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. For example, the memory 405 may store a number of bitmaps 420 that indicate the acknowledgement (ACK) or negative acknowledgement (NACK) of code block groups transmitted to a scheduled entity or UE.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include software configured for various functions, including, for example, processing instructions 452 and communication instructions 454. For example, the software may be configured to implement one or more of the functions described above in relation to FIGS. 7-21.

Figure 5:
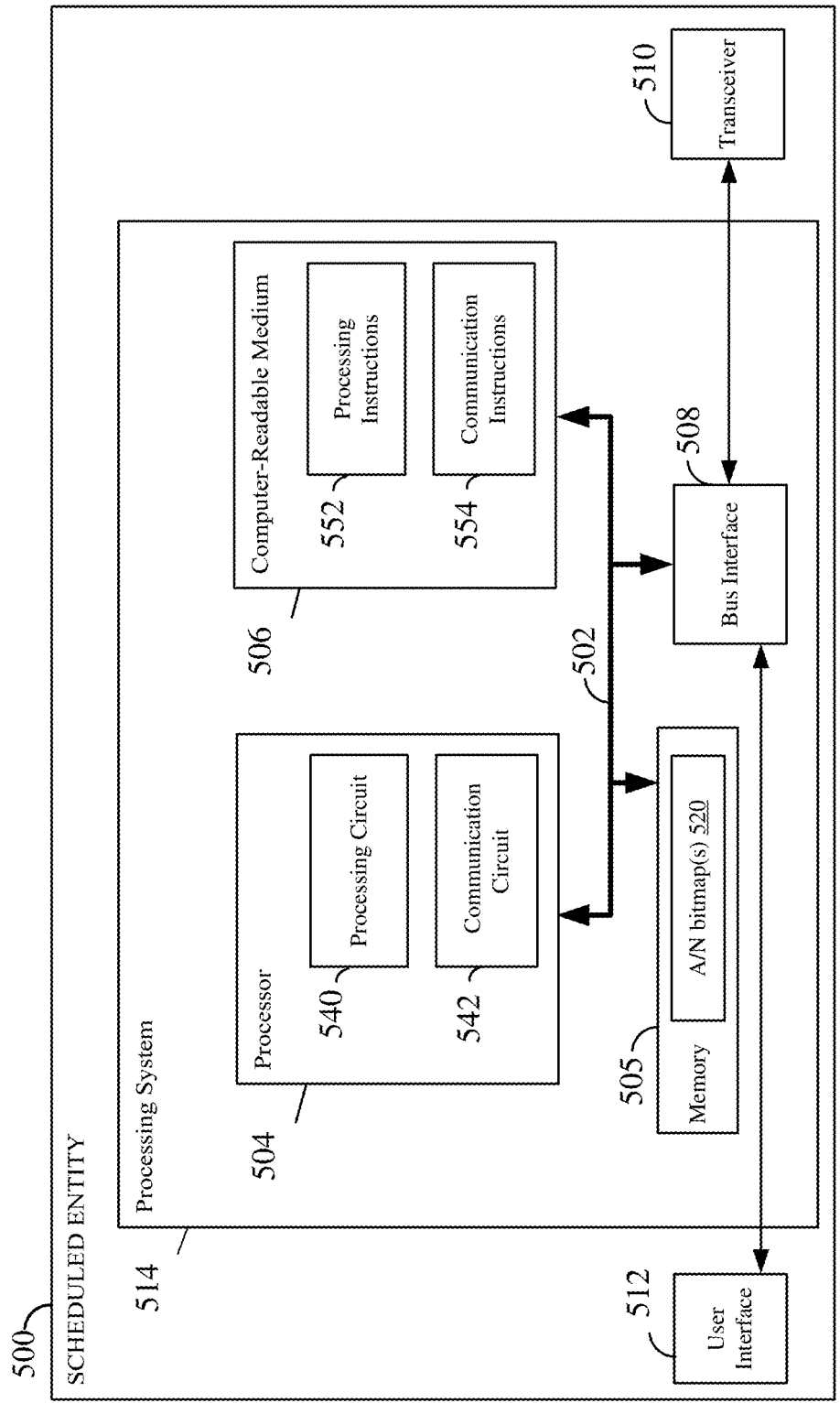
FIG. 5 is a block diagram conceptually illustrating an example of a hardware implementation for a scheduled entity according to some aspects of the disclosure.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1, 2, 9, and/or 10.

The processing system 514 may be substantially the same as the processing system 414 illustrated in FIG. 4, including a bus interface 508, a bus 502, memory 505, a processor 504, and a computer-readable medium 506. The memory 505 may store a number of bitmaps 520 that indicate the ACK or NACK of code block groups received from a scheduling entity or base station. Furthermore, the scheduled entity 500 may include a user interface 512 and a transceiver 510 substantially similar to those described above in FIG. 4. That is, the processor 504, as utilized in a scheduled entity 500, may be used to implement any one or more of the processes described below and illustrated in FIGS. 7-21.

In some aspects of the disclosure, the processor 504 may include circuitry configured for various functions, including, for example, a processing circuit 540 and a communication circuit 542. For example, the circuitry may be configured to implement one or more of the functions described below in relation to FIGS. 7-21. In one or more examples, the computer-readable storage medium 506 may include software configured for various functions, including, for example, processing instructions 552 and communication instructions 554. For example, the software may be configured to implement one or more of the functions described above in relation to FIGS. 7-21.

Example Methods for Downlink Retransmission of Code Block Groups Under Unreliable CBG Level ACK/NACK In 5G NR, multiple code blocks (CBs) may be grouped or arranged into multiple code block groups. A transport block (TB) may include multiple code block groups, each including one or more CBs. In some examples, a code block group (CBG) may include one CB, all CBs of a TB, or any number of CBs of a TB. A UE may acknowledge a downlink transmission using CBG level feedback. In the next generation networks (e.g., 5G NR), HARQ retransmissions may correspond to CBG units, instead of entire TBs. That is, CBG-level ACK and NACK (A/N) feedback may be supported. For CBG level ACK/NACK feedback, downlink PDSCH CBs in a TB are grouped into code block groups, and one ACK/NACK bit is generated and fed back by a receiver (e.g., UE) for each CBG. The base station (e.g., gNB) may retransmit one or more CBGs corresponding to which it received NACKs indicating that those CBGs were not correctly received by the receiver. Generally, data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (e.g., MIMO), more than one transport block may be transmitted per TTI.

Certain designs provide long cyclic redundancy check (CRC) protection for CBG level ACK/NACK feedback and assume that the CBG ACK/NACK feedback from a receiver (e.g., UE) is reliably received by the transmitter (e.g., gNB). Thus, these designs consider erasure events, but do not consider error events in receiving the feedback at the gNB. In an erasure event, a HARQ retransmission including one or more CBGs is not successfully received by a receiver. Even when long CRC protection is used for CBG level feedback, a long CRC alone may not be sufficient to handle certain error events in receiving the feedback at a base station.

However, in some designs, there may be either no CRC or the CRC code is not long enough for reliable CBG ACK/NACK feedback, resulting in potential errors in receiving the CBG ACK/NACK feedback at the gNB or base station. Thus, when a UE feeds back a CBG ACK/NACK, there may be a decoding error at the gNB receiving the feedback. In that case, the gNB may retransmit a wrong set of CBGs based on the wrongly received feedback. For example, a UE may transmit CBG ACK/NACK feedback including NACKs for a set A of CBGs indicating that the CBGs in set A were not received correctly at the UE. The gNB, however, may incorrectly decode and/or receive the feedback from the UE and retransmit a different set B of CBGs to the UE. This may lead the UE to combine Log Likelihood Ratios (LLRs) from CBGs in set B with LLRs from CBGs in set A from a previous transmission of CBGs in set A. This mismatch may result in a failure in decoding one or more set A CBGs. Further, this error may be propagated further because once the wrong LLRs have been combined for a particular CBG, the decoding of that CBG may not pass or succeed even with multiple retransmissions of the CBG.

Figure 6A:
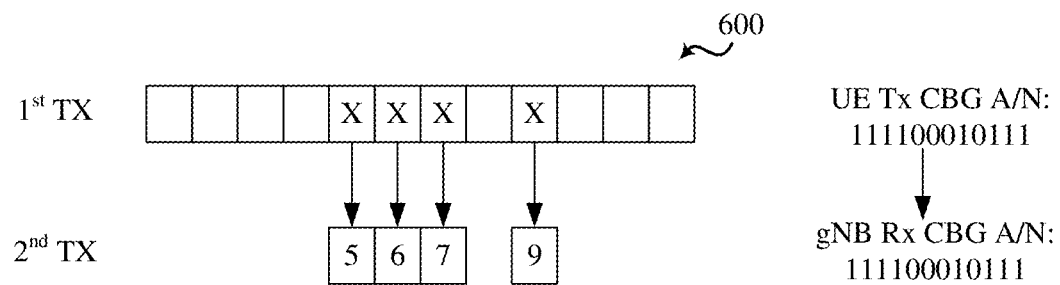
FIG. 6a illustrates exemplary code block group (CBG) feedback that is correctly received and decoded, according to some aspects of the disclosure.

FIG. 6a illustrates exemplary CBG ACK/NACK feedback from a UE (e.g., scheduled entity 106) that is correctly received and decoded by a gNB (e.g., scheduling entity 108), in accordance with certain aspects of the present disclosure. A 1st transmission (TX) may be CBG ACK/NACK feedback (e.g., bitmap 600) transmitted by a UE corresponding to a set of CBGs received from the gNB. As shown in FIG. 6a, the UE transmits the ACK/NACK feedback 600 as the bitmap "111100010111" with each '1' representing an ACK and each '0' representing a NACK for a particular CBG. Thus, the ACK/NACK feedback indicates that the UE did not receive correctly a total of four CBGs at positions 5, 6, 7, and 9 (bit 1 being the leftmost bit of the bitmap shown in FIG. 6a). In this example, the gNB correctly decodes the feedback as "111100010111" and retransmits CBGs at positions 5, 6, 7, and 9 shown as the 2nd TX in FIG. 6a. As the UE receives the retransmitted CBGs from the gNB, the UE may combine LLRs corresponding to the retransmitted CBGs with corresponding LLRs of the CBGs from the previous transmission in an attempt to decode the CBGs.

Figure 6B:
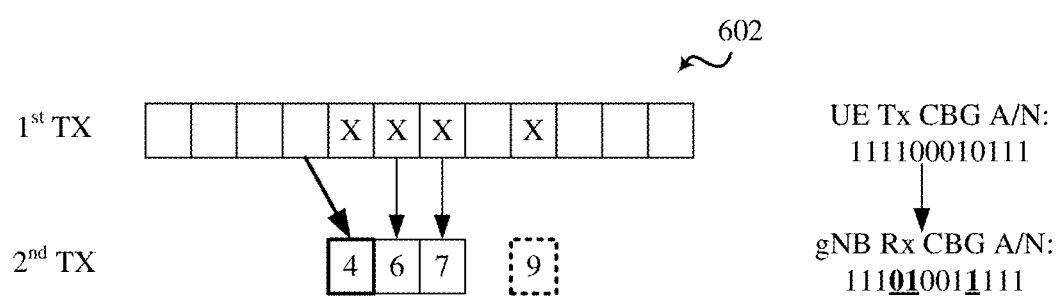
FIG. 6b illustrates CBG feedback that is incorrectly received and decoded, according to some aspects of the disclosure.

FIG. 6b illustrates CBG ACK/NACK feedback from a UE that is incorrectly received and/or decoded by the gNB, in accordance with certain aspects of the present disclosure. As shown, the UE transmits ACK/NACK feedback (e.g., bitmap 602) to the gNB as part of a 1st TX corresponding to a set of CBGs received from the gNB. In this example, the UE transmits the ACK/NACK feedback as the bitmap "111100010111" with each '1' representing an ACK and each '0' representing a NACK for a particular CBG. Out of the 12 bits that are being fed back, 8 bits are ACK'ed. These represent the CBGs at positions 1-4, 8, and 10-12, whose values were correctly decoded. The ACK/NACK feedback 602 indicates that the UE did not receive correctly a total of four CBGs at positions 5, 6, 7, and 9 by transmitting NACKs corresponding to these CBGs. However, the gNB incorrectly decodes the received ACK/NACK feedback as "111010011111" (not the correct bitmap 111100010111) and retransmits CBGs 4, 6, and 7 to the UE because these CBGs correspond to the 0 bits (i.e., NACK'ed). Thus, when the UE feeds back a CBG ACK/NACK corresponding to the wrongly received bitmap and there is a decoding error at the gNB, the gNB may assume a wrong set of CBGs that need retransmission. As a result, the UE may combine LLRs of the retransmitted CBG 4 with LLR of previously received CBG 5 (instead of combining LLRs for a retransmitted CBG 5 with LLR for a corresponding previously received CBG 5) leading to a decoding failure of CBG 5. Further, the gNB does not transmit CBG 9 because the CBG at position 9 was incorrectly decoded as an ACK or "1", which may also lead to a decoding failure or delayed decoding if the UE requests and awaits another retransmission of CBG 9. Thus, LLR combining for one or more CBGs may be incorrect, as the UE may combine LLRs from a retransmitted CBG set B to a soft-buffer of CBG set A where B!=A (i.e., B is not the same as A). In an aspect of the disclosure, once wrong LLRs are combined for a CBG, the decoding for the CBG will not pass no matter how many retransmissions of the CBG take place in the future.

Certain aspects of the present disclosure provide techniques for retransmission of CBGs when CBG level ACK/

NACK feedback is unreliable. These techniques include the gNB sending an indication to the UE regarding whether a CBG ACK/NACK feedback was correctly received by the gNB. The UE processes a retransmission of one or more CBGs based on such indication received from the gNB.

Figure 7:
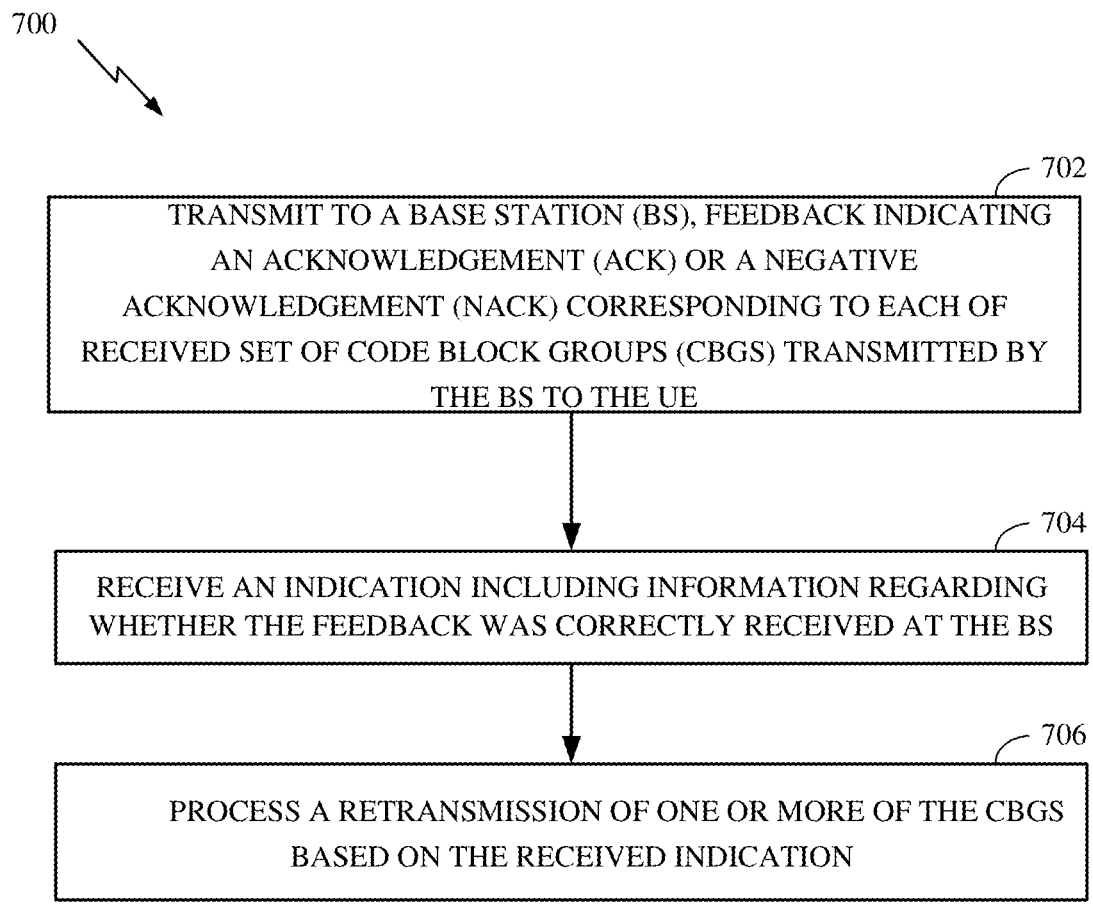
FIG. 7 illustrates example operations performed by a UE for managing retransmission of CBGs when CBG feedback is unreliable, according to some aspects of the disclosure.

FIG. 7 illustrates example operations 700, performed by a UE, for managing retransmission of CBGs when CBG ACK/NACK feedback is unreliable, in accordance with certain aspects of the present disclosure. The UE may be any of the UEs illustrated in FIGS. 1, 2, 9, and 10.

The UE, at 702, transmits to a base station (BS) (e.g., scheduling entity 108), HARQ feedback indicating an ACK or a NACK corresponding to each of received set of CBGs transmitted by the BS. At 704, the UE receives an indication including information regarding whether the feedback was correctly received at the BS. At 706, the UE processes a retransmission of one or more of the CBGs based on the received indication.

Figure 8:
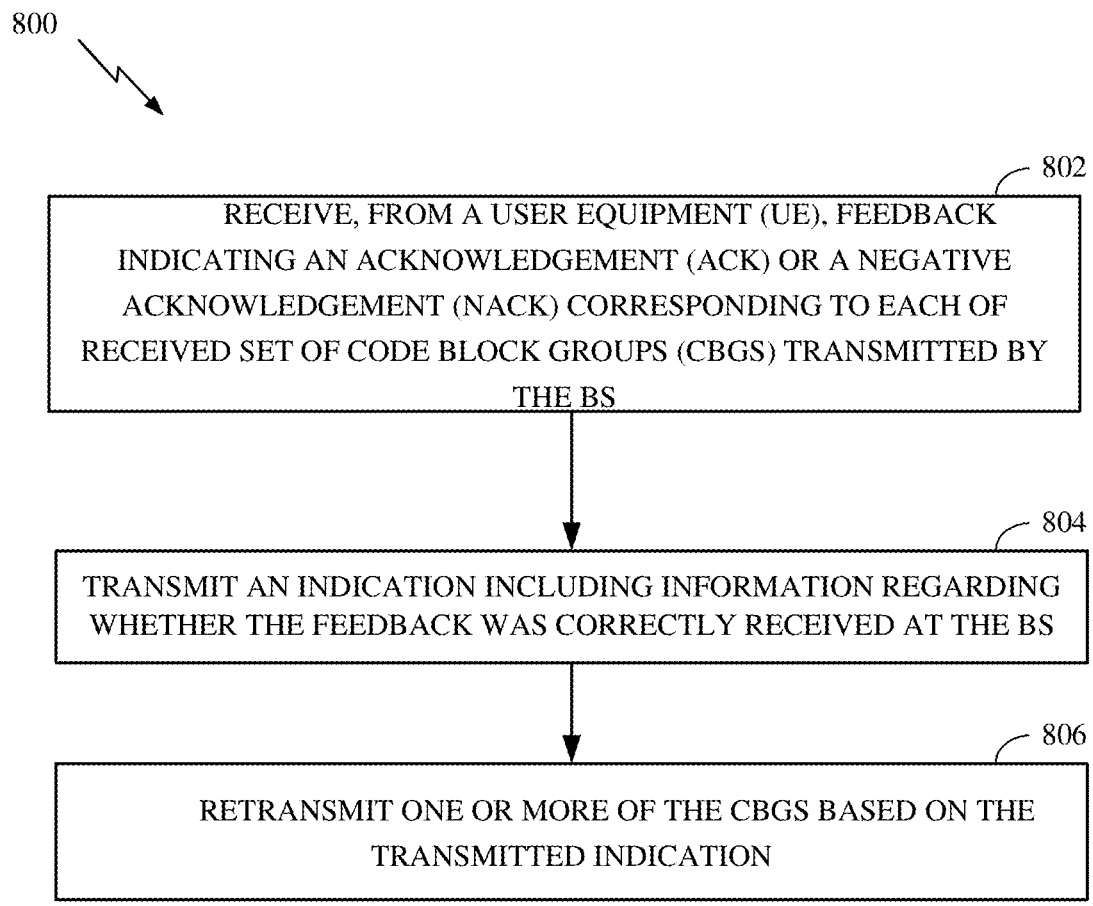
FIG. 8 illustrates example operations performed by a base station for managing retransmission of code block groups when CBG feedback is unreliable according to some aspects of the disclosure.

FIG. 8 illustrates example operations 800, performed by a BS (e.g., scheduling entity 108), for managing retransmission of CBGs when CBG ACK/NACK feedback is unreliable, in accordance with certain aspects of the present disclosure. The BS, at 802, receives from a UE CBG feedback indicating an ACK or a NACK corresponding to each of received set of CBGs transmitted by the BS. At 804, the BS transmits an indication including information regarding whether the feedback was correctly received at the BS. At 806, the BS retransmits one or more of the CBGs based on the transmitted indication.

In certain aspects of the disclosure, the CBG feedback from the UE includes information regarding a first bitmap of ACKs and NACKs corresponding to the CBGs received from the BS. The BS receives and decodes the information regarding the first bitmap received from the UE and transmits back to the UE an indication including information regarding a result of the decoding. For example, the BS transmits to the UE information regarding a second bitmap of ACKs and NACKs as decoded by the BS.

The UE, based on the second bitmap received from the BS, may determine whether the BS correctly received and decoded the CBG feedback, and also ACKs and NACKs corresponding to which CBGs were incorrectly decoded, if any, by the BS. In an aspect of the disclosure, the UE compares the second bitmap received from the BS with the first bitmap transmitted to the BS. If the second bitmap is the same as the first bitmap, the UE determines that the BS decoded the CBG feedback correctly, and continues decoding CBGs retransmitted from the BS (e.g., based on the second bitmap) by soft combining of LLRs. If the second bitmap is not the same as the first bitmap, the UE determines that the BS was unable to decode the CBG feedback correctly, and does not use one or more CBGs retransmitted from the BS (e.g., based on the second bitmap) for decoding.

For example, the UE reports to the BS CBG feedback including an ACK/NACK bitmap set A corresponding to a plurality of CBGs received from the BS. The BS decodes the bitmap set A received from the UE as ACK/NACK bitmap set B. It is possible that B!=A (i.e., B is not the same as A) due to a decoding error at the BS. The BS may include the decoded bitmap set B in the next DCI transmission, for example, as part of a DL grant for a retransmission of CBGs. The DCI indicates that the PDSCH in the retransmission includes CBGs corresponding to ACK/NACK bitmap set B. The UE decodes the DCI and compares bitmap set B with bitmap set A. Generally, DCI signals the allocation of resources to the UE. For example, the BS may use the DCI to schedule UL resources on the PUSCH and DL resources on the PDSCH. To decode the data, the UE first decodes the DCI and receives data on the scheduled DL resources and transmits data on the scheduled UL resources indicated in the DCI.

If bitmap set B is the same as bitmap set A, the UE determines that the BS correctly decoded the bitmap set A and the content of the current retransmission is as expected, and the UE may continue to decode the CBGs with proper soft combining of LLRs from the retransmission and previous transmissions of the CBGs. In certain aspects of the present disclosure, some of the CBGs (e.g., a set C of CBGs) may pass decoding in this round. Therefore, the UE may request another retransmission of CBGs that still failed decoding in this round (e.g., CBGs in set A, but not in set C).

On the other hand, if bitmap set B is different from bitmap set A, the UE determines that there was a decoding error at the BS and that the BS incorrectly decoded the bitmap set A, and the content of the current retransmission is not as expected. In that case, the UE may not combine LLRs from CBGs in the current retransmission with LLRs from CBGs in previous transmissions or retransmissions. However, some of the CBGs in set B may happen to be in set A as well (e.g., CBGs in A∩B). The UE may continue decoding those CBGs with proper soft combining of LLRs. In an aspect of the present disclosure, some of the CBGs may pass decoding in this round (e.g., a set C of CBGs). In the next round of CBG ACK/NACK feedback, the UE may request retransmission of CBGs that still failed decoding (e.g., in set A but not in set C).

Figure 9:
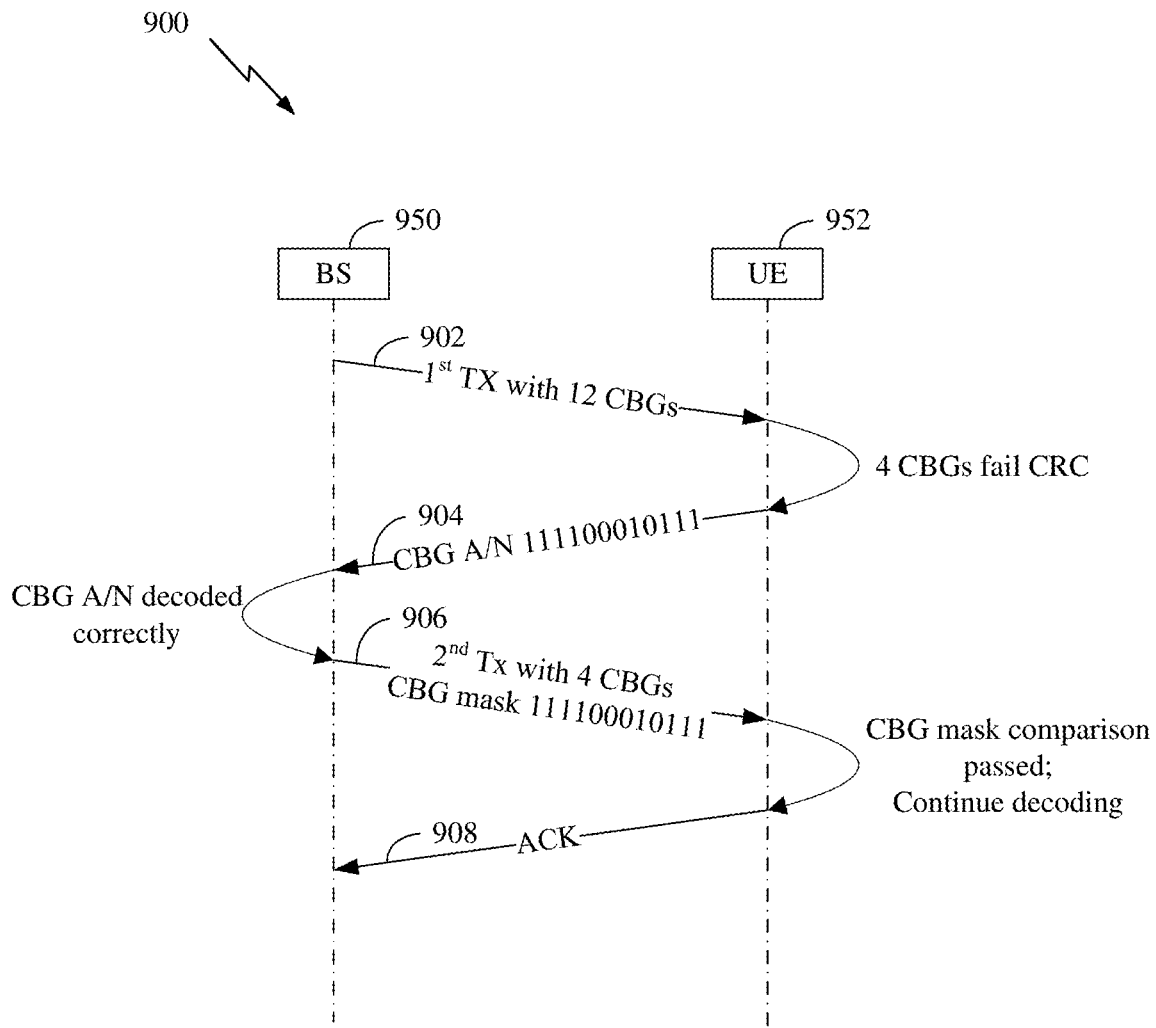
FIG. 9 illustrates messages exchanged between a base station (BS) and a UE when CBG feedback from a UE is correctly received and decoded by the BS.

FIG. 9 illustrates messages exchanged between a BS and a UE when CBG ACK/NACK feedback from a UE is correctly received and decoded by the BS, in accordance with certain aspects of the present disclosure. At 902, the BS 950 transmits a set of 12 CBGs to the UE 952 as part of a first transmission (TX). In this example, four of the 12 CBGs fail CRC at the UE 952. At 904, the UE 952 transmits CBG ACK/NACK feedback to the BS 950 including ACK/NACK bitmap "111100010111". Each '1' in the bitmap indicates an ACK and each '0' indicates a NACK for the corresponding CBG. In this example, the bitmap indicates that CBGs 5, 6, 7, and 9 were not correctly decoded by the UE. In this case, the ACK/NACK bitmap is correctly decoded by the BS 950. At 906, the BS 950 transmits a result of the decoding including a bitmap "111100010111" as part of a second TX. The BS 950 also retransmits CBGs 5, 6, 7 and 9 based on the correctly decoded bitmap. The UE 952 compares the bitmap that the UE transmitted at 904 with the bitmap received from the BS 950. The comparison passes when both bitmaps are the same, indicating that the BS 950 correctly decoded the ACK/NACK feedback at 904. At 908, the UE 952 transmits one or more ACKs acknowledging the receipt of the bitmap at 906 and/or the retransmitted CBGs received from the BS.

Figure 10:
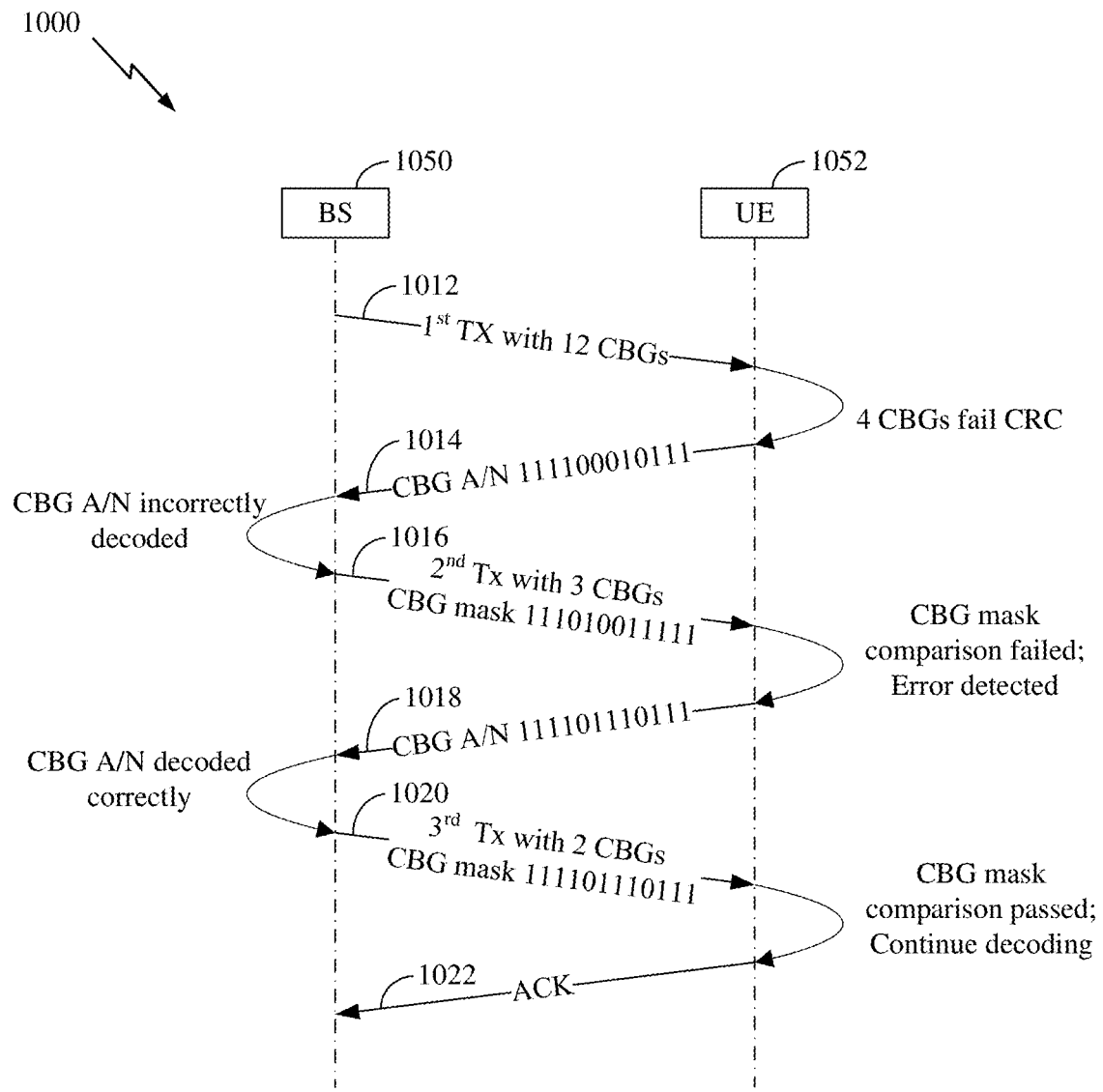
FIG. 10 illustrates messages exchanged between a BS and a UE when CBG feedback from a UE is incorrectly received and/or decoded by the BS.

FIG. 10 illustrates messages exchanged between a BS 1050 and a UE 1052 when a CBG feedback from the UE is incorrectly received and/or decoded by the BS, in accordance with certain aspects of the present disclosure. At 1012, the BS 1050 transmits a set of 12 CBGs to the UE 1052 as part of a first transmission (TX). For example, four of the 12 CBGs fail CRC check at the UE 1052. At 1014, the UE 1052 transmits CBG feedback to the BS 1050 including an ACK/NACK bitmap "111100010111". Each '1' in the bitmap indicates an ACK and each '0' indicates a NACK. In this case, the bitmap indicates that CBGs 5, 6, 7, and 9 were not correctly decoded by the UE 1052. However, the ACK/NACK bitmap is incorrectly decoded by the BS 1050, for example due to a decoding error, and the BS 1050, at 1016, may transmit a result of the decoding including a bitmap "111010011111" as part of a second TX. The UE 1052 compares the received bitmap with the bitmap it transmitted earlier at 1014, and determines that there was a decoding error at the BS 1050 as the two bitmaps are not the same. The BS 1050 also retransmits CBGs 4, 6 and 7 in accordance with the bitmap it transmitted at 1016. The UE 1052 may continue to decode CBGs 6 and 7 by soft combining of LLRs. However, the UE 1052 is unable to decode CBGs 5 and 9 because the BS 1050 did not retransmit these CBGs. At 1018, the UE 1052 transmits another CBG feedback including ACK/NACK bitmap "111101110111" indicating that CBGs 5 and 9 have still not been decoded (e.g., as indicated by '0s' at positions 5 and 9 in the bitmap). The BS 1050 correctly decodes this bitmap and transmits, at 1020, a result of this decoding including bitmap "111101110111". The UE 1052 compares the bitmap received at 1020 with the bitmap it transmitted at 1018. The UE detects that the two bitmaps are the same and determines that the BS 1050 correctly decoded the bitmap this time. The UE may continue to decode CBGs 5 and 9 by soft combining LLRs and sends one or more ACKs at 1022 to acknowledge the bitmap received at 1020.

In certain aspects of the disclosure, the BS includes information regarding a result of decoding CBG feedback from a UE in the DCI that schedules retransmission of one or more CBGs (e.g., includes DL grant for the retransmission of one or more CBGs). For example, the BS transmits to the UE information regarding a bitmap of ACKs and NACKs as decoded by the BS in the DCI that schedules retransmission of one or more CBGs to the UE based on the ACK/NACK bitmap as decoded by the BS. In certain aspects of the disclosure, as a result of including the information regarding the result of decoding CBG feedback from the UE, the DCI that includes the information may be longer than a regular DCI (e.g., default DCI) used for transmission of transport blocks (TBs). In an aspect of the disclosure, a same length of the DCI is maintained regardless of whether or not the DCI includes the information regarding the result of decoding ACK/NACK feedback from the UE. For example, a DCI not including the information regarding the decoding may be zero padded to match a length of the DCI including the information regarding the decoding. A potential benefit of maintaining the same length of the DCI is that the UE may perform only one blind decoding for a DCI decoding candidate. However, this design may lead to inefficiency (e.g., resource wastage) when a DCI transmission does not include a CBG based retransmission, due to the zero padding.

In certain aspects of the disclosure, two different lengths of the DCI may be used. For example, one DCI length (e.g., default DCI length) may be used for DCIs for TB based transmission, and another length may be used for DCIs that include information regarding CBG based retransmission (e.g., ACK/NACK bitmap of decoded CBG feedback). This may result in more efficient DCI delivery as no zero padding is used when sending TB based transmission. However, a problem with this approach is more blind decodings at the UE to decode twice for each decoding candidate. In certain aspects of the disclosure, the UE may perform two blind decodings all the time to decode DCI when information regarding at least one CBG feedback is transmitted by the UE, as the UE may not know when the CBG based retransmission may be granted. The UE may stop decoding the DCI for two different lengths when a new DL grant for the same HARQ process used for CBG feedback is received.

In certain aspects of the disclosure, the information regarding the result of decoding CBG feedback (e.g., decoded ACK/NACK bitmap) may be transmitted in a companion DCI that is different from a DCI (e.g., default DCI) that includes retransmission grant corresponding to one or more CBGs to be retransmitted. In an aspect of the disclosure, the companion DCI may be designed to have the same length as the DCI including the retransmission grant so that the UE may not need to perform multiple blind decodings to decode the DCIs. In an aspect of the disclosure, the default DCI may include an indication of the companion DCI (e.g., including information regarding a search position of the companion DCI) for robustness.

In certain aspects the disclosure, a problem with including information regarding an ACK/NACK bitmap (e.g., including the entire ACK/NACK bitmap itself) in the DCI is that the length of the DCI is increased considerably. This is particularly wasteful when the number of transmitted and/or retransmitted CBGs is large. In certain aspects of the disclosure, instead of sending the entire CBG ACK/NACK bitmap as the feedback, a hash of the CBG ACK/NACK bitmap may be transmitted as the feedback to reduce DCI length, and thus, reduce resource wastage. However, a problem with this approach is that there is a chance of residual error in decoding CBG feedback because all CBG ACK/NACK bitmap decoding errors may not be detected at the BS. For example, this problem may arise when two different CBG ACK/NACK patterns map to the same hash. In certain aspects of the disclosure, a length of the hash may be controlled to reduce probability of decoding errors. In an aspect of the disclosure, the hash of a CBG ACK/NACK bitmap or pattern may include a CRC (e.g., shorter than a regular CRC) generated based on the ACK/NACK pattern to be transmitted to the BS.

Figure 11:
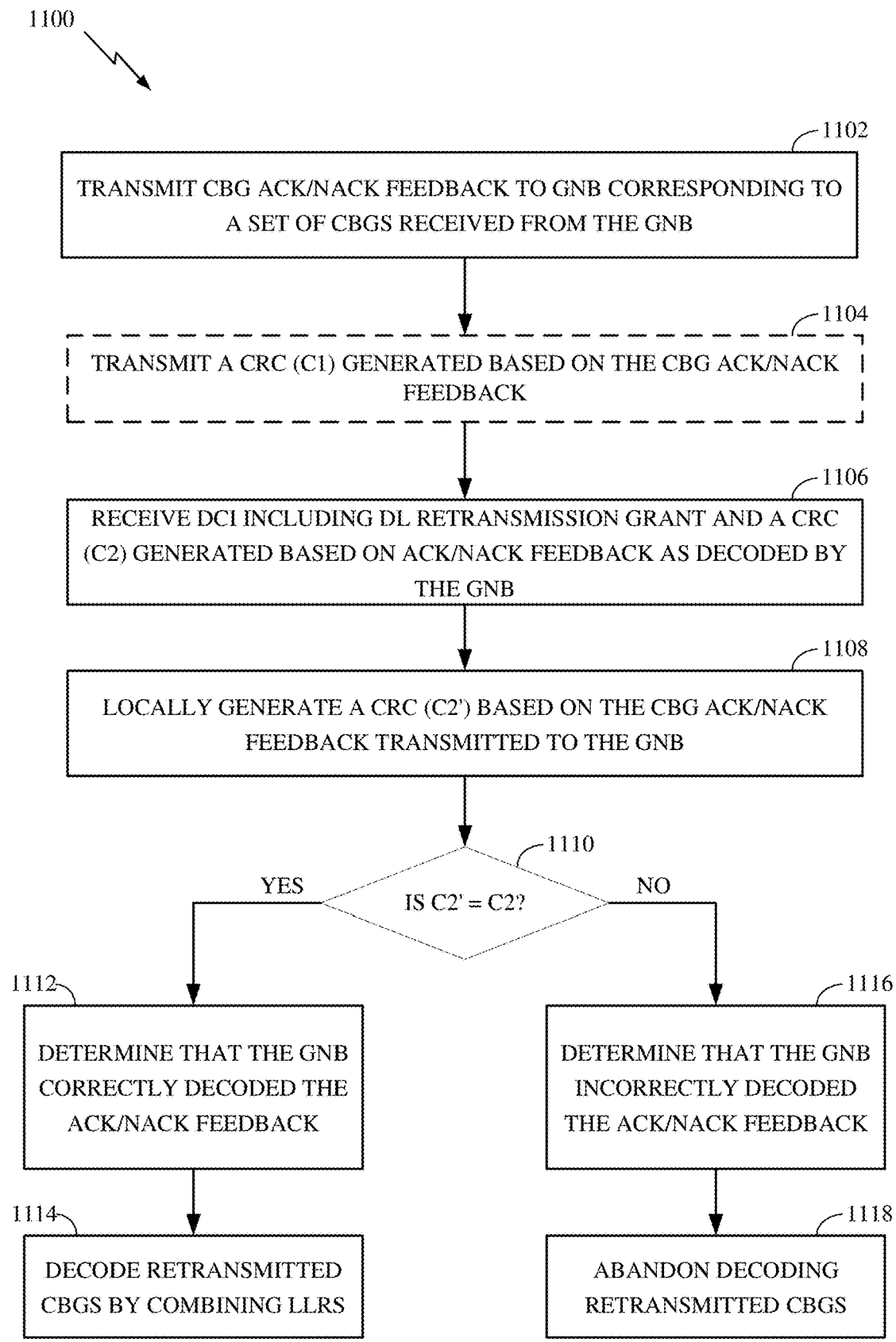
FIG. 11 illustrates example operations performed by a UE, for using a hash of CBG ACK/NACK bitmap to process retransmission of one or more CBGs, according to some aspects of the disclosure.

FIG. 11 illustrates example operations 1100 performed by a UE, for using a hash of CBG ACK/NACK bitmap to process retransmission of one or more CBGs, in accordance with certain aspects of the present disclosure. At 1102, a UE transmits CBG ACK/NACK feedback (e.g., an ACK/NACK bitmap) to a BS corresponding to a set of CBGs received from the BS. At 1104, the UE optionally transmits a CRC (C1) generated based on the CBG ACK/NACK feedback for reducing decoding errors at the BS. At 1106, the UE receives DCI including DL grant for CBG based retransmissions and a CRC (C2) generated based on the CBG ACK/NACK feedback decoded at the BS. At 1108, the UE locally generates a CRC (C2') based on the CBG ACK/NACK feedback it sent to the BS. In an aspect of the disclosure, for generating C2', the UE uses the same CRC generation function the BS used to generate C2. At 1110, the UE compares the locally generated C2' with the C2 received from the BS. If C2=C2' (i.e., CRCs match), the UE determines that the BS correctly decoded the CBG ACK/NACK feedback at 1112 and proceeds with decoding one or more retransmitted CBGs at 1114. If C2!=C2' (i.e., C2 and C2' are not the same), the UE determines that the BS incorrectly decoded the CBG ACK/NACK feedback at 1116 and abandons decoding the retransmitted CBGs at 1118.

Figure 12:
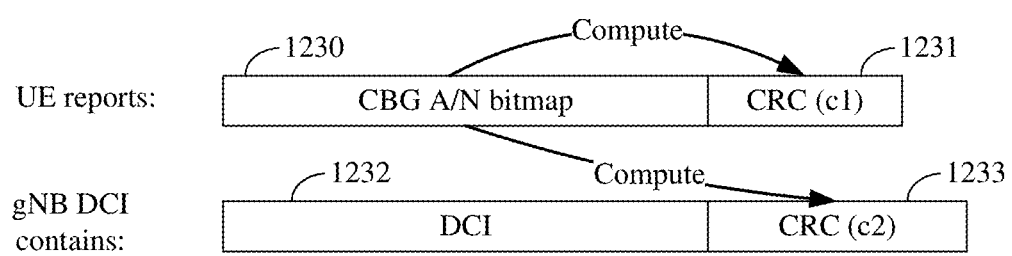
FIG. 12 illustrates a process for transmitting a hash of CBG ACK/NACK bitmap for use in retransmitting one or more CBGs, according to some aspects of the disclosure.

FIG. 12 illustrates a process for transmitting a hash of CBG ACK/NACK feedback for use in retransmitting one or more CBGs, in accordance with certain aspects of the present disclosure. As shown in FIG. 12, the UE sends CBG ACK/NACK feedback (e.g., ACK/NACK bitmap 1230) to the BS. In an aspect of the disclosure, the UE also sends to the BS, a CRC (C1) 1231 that is generated based on the CBG ACK/NACK feedback 1230 to reduce errors in decoding the feedback at the BS. The BS receives and decodes the CBG ACK/NACK feedback and verifies the decoding based on the CRC (C1). In certain aspects of the disclosure, the CRC C1 may not be long enough, and thus, a decoded ACK/NACK feedback may still be wrong in spite of passing the CRC check. The BS schedules CBG based retransmission and includes in the DL grant 1232, another CRC (C2) 1233 that is generated based on the decoded CBG ACK/NACK bitmap. The UE receives the DL grant 1232 including the CRC (C2) 1233.

The UE locally generates a CRC (C2') based on the CBG ACK/NACK bitmap it sent to the BS using the same CRC generation function the BS used to generate C2, and compares C2' with C2. If C2=C2', the UE determines that the BS correctly decoded the CBG feedback and proceeds with decoding one or more retransmitted CBGs. If C2!=C2' (i.e., if C2 is not the same as C2'), the UE determines that the BS incorrectly decoded the CBG ACK/NACK feedback and abandons decoding the retransmitted CBGs. In certain aspects of the disclosure, as the BS does not transmit the ACK/NACK bitmap, the UE has no way of determining the ACKs or NACKs corresponding to which CBGs were decoded incorrectly, and ACKs or NACKs corresponding to which CBGs were decoded correctly. Therefore, the UE may not use any of the retransmitted CBGs for decoding, even if some of the retransmitted CBGs were expected by the UE. In an aspect of the disclosure, after abandoning the decoding of the retransmitted CBGs, the UE may resend the previously sent CBG ACK/NACK feedback to the BS. Alternatively, the UE sends a TB NACK to the BS in response to determining that the BS did not decode the CBG ACK/NACK feedback correctly.

In certain aspects of the disclosure, if both C1 and C2 are used and they are of the same length, C1 and C2 may need to be generated using different CRC generation functions. Otherwise, a CBG ACK/NACK decoding error may not be detected. For example, a CBG ACK/NACK decoding error at the BS that passes CRC check C1 implies C1=C2, if the same CRC function is used to generate C2. Alternatively, a common CRC generation function of length L1+L2 may be used for generating both C1 and C2, but using the first L1 bits for C1 and the last L2 bits for C2.

In certain aspects of the disclosure, the BS may embed the decoded CBG ACK/NACK feedback in the CRC transmitted with the DCI. For example, the BS decodes CBG ACK/NACK feedback pattern A from the UE as CBG ACK/NACK pattern B, where it is possible that B!=A (i.e., B is not the same as A) due to decoding error at the BS. For the CBG retransmission, the BS generates the DCI (e.g., including DL grant for the retransmission) and CRC based on the DCI, and scrambles pattern B into the CRC. Thus, the CRC of the DCI is different for different decoded ACK/NACK patterns B. The UE decodes the DCI (e.g., blind decoding), and scrambles pattern A into a CRC locally generated from the decoded DCI, using a method similar to the method used by the BS to generate the DCI. The UE then compares the locally generated CRC with the CRC received from the BS. If the CRC comparison passes (e.g., if the CRCs are the same), the UE interprets the blind decoding result as a valid grant. The passing of the CRC comparison verifies that A=B and that the CBG ACK/NACK feedback was correctly received by the BS, and that the content of the current retransmission PDSCH is as expected. The UE continues decoding one or more retransmitted CBGs with proper soft combining of LLRs. On the other hand, if the CRC comparison fails, the UE may simply skip the blind decoding and may not see the grant at all.

From the BS's perspective, if B=A, the UE will respond to the DL grant and the BS receives another CBG ACK/NACK pattern as a response. This confirms that the decoded pattern B was correct. When B!=A (i.e., if B is not the same as A), the UE is not able to detect the grant and the BS does not receive any CBG ACK/NACK pattern from the UE as a response. This indicates to the BS that the previously decoded pattern B was wrong. In an aspect of the disclosure, in this case, the BS may fall back to a TB level retransmission.

Figure 13:
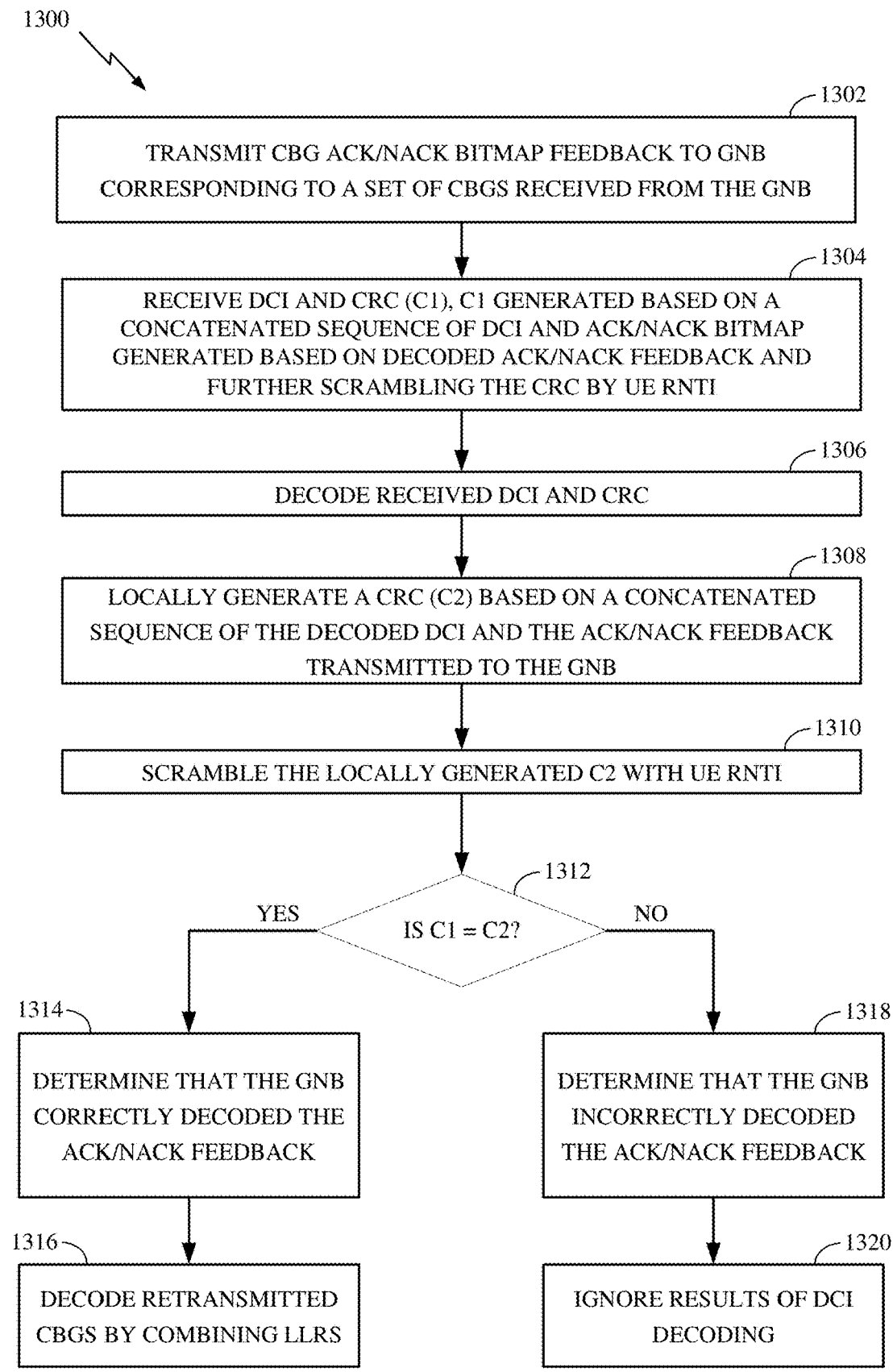
FIG. 13 illustrates example operations by a UE for a first technique of using embedded CBG ACK/NACK pattern in DCI transmission to process retransmitted CBGs, according to some aspects of the disclosure.

FIG. 13 illustrates example operations 1300 by a UE, for a first technique of using embedded CBG ACK/NACK pattern in DCI transmission to process retransmitted CBGs, in accordance with certain aspects of the present disclosure. The UE, at 1302, transmits CBG feedback (e.g., an ACK/NACK bitmap) to the BS corresponding to a set of CBGs received from the BS. At 1304, the UE receives DCI (e.g., scheduling retransmission of CBGs) and a CRC (C1). C1 is generated based on a concatenated sequence of the DCI and an ACK/NACK bitmap as decoded by the BS and further scrambled by a UE RNTI (Radio Network Temporary Identifier). At 1306, the UE decodes the received DCI and CRC. At 1308, the UE locally generates another CRC (C2) based on a concatenated sequence of the decoded DCI and the ACK/NACK bitmap transmitted to the BS. At 1310, the UE scrambles the locally generated C2 with the UE RNTI. At 1312, the UE compares the locally generated C2 with the received C1. If the CRCs match (e.g., the CRCs are the same), the UE determines that the ACK/NACK feedback was correctly decoded by the BS at 1314 and proceeds to decode one or more retransmitted CBGs by proper soft combining at 1316. If the CRCs do not match, the UE determines that the ACK/NACK feedback was incorrectly decoded by the BS at 1318 and ignores the results of the DCI decoding at 1320.

Figure 14:
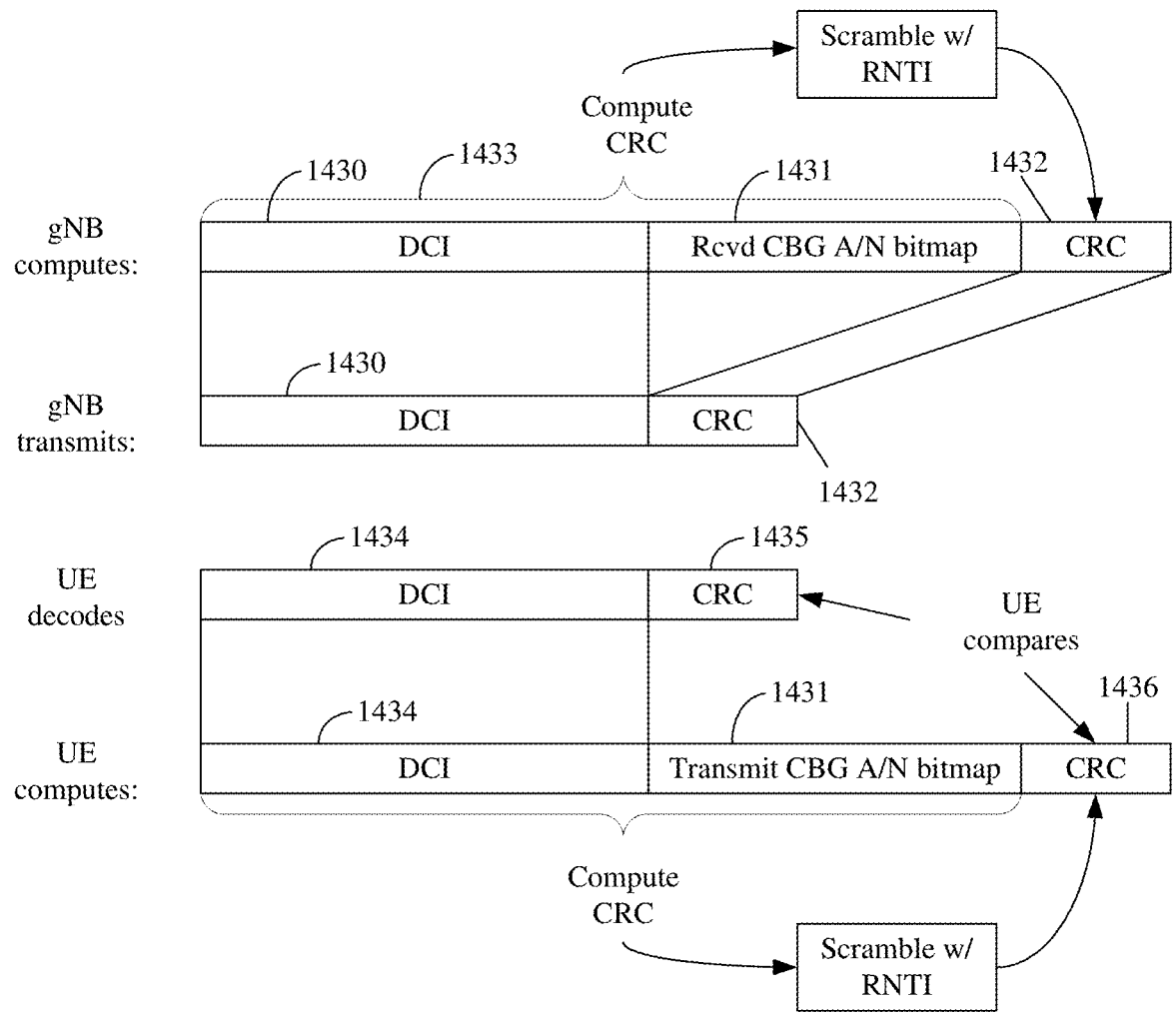
FIG. 14 illustrates the first technique for embedding a decoded CBG ACK/NACK pattern in DCI by a BS for use in retransmitting one or more CBGs, according to some aspects of the disclosure.

FIG. 14 illustrates the first technique for embedding a decoded CBG ACK/NACK pattern in DCI CRC by a BS for use in retransmitting one or more CBGs, in accordance with certain aspects of the present disclosure. As shown in FIG. 14, the BS generates a DCI 1430 and concatenates the DCI with the decoded CBG ACK/NACK bitmap 1431. The BS then generates a CRC 1432 using the concatenated sequence 1433 of the DCI and the decoded CBG ACK/NACK bitmap. The BS scrambles the generated CRC with an identity of the UE (e.g., RNTI) and transmits the DCI and the CRC, without the CBG ACK/NACK bitmap part.

The UE decodes the DCI 1434 and CRC 1435 received from the BS. The UE locally generates a CRC 1436 with the received DCI 1434 concatenated with the CBG ACK/NACK bitmap 1431 transmitted to the BS. The UE then scrambles the locally generated CRC 1436 with the identity of the UE (e.g., RNTI) and compares the received CRC 1435 with the locally generated CRC 1436. As noted above, if the CRCs match, the UE proceeds with decoding the retransmitted CBGs. If the CRCs do not match, the UE may ignore the results of decoding the DCI.

Figure 15:
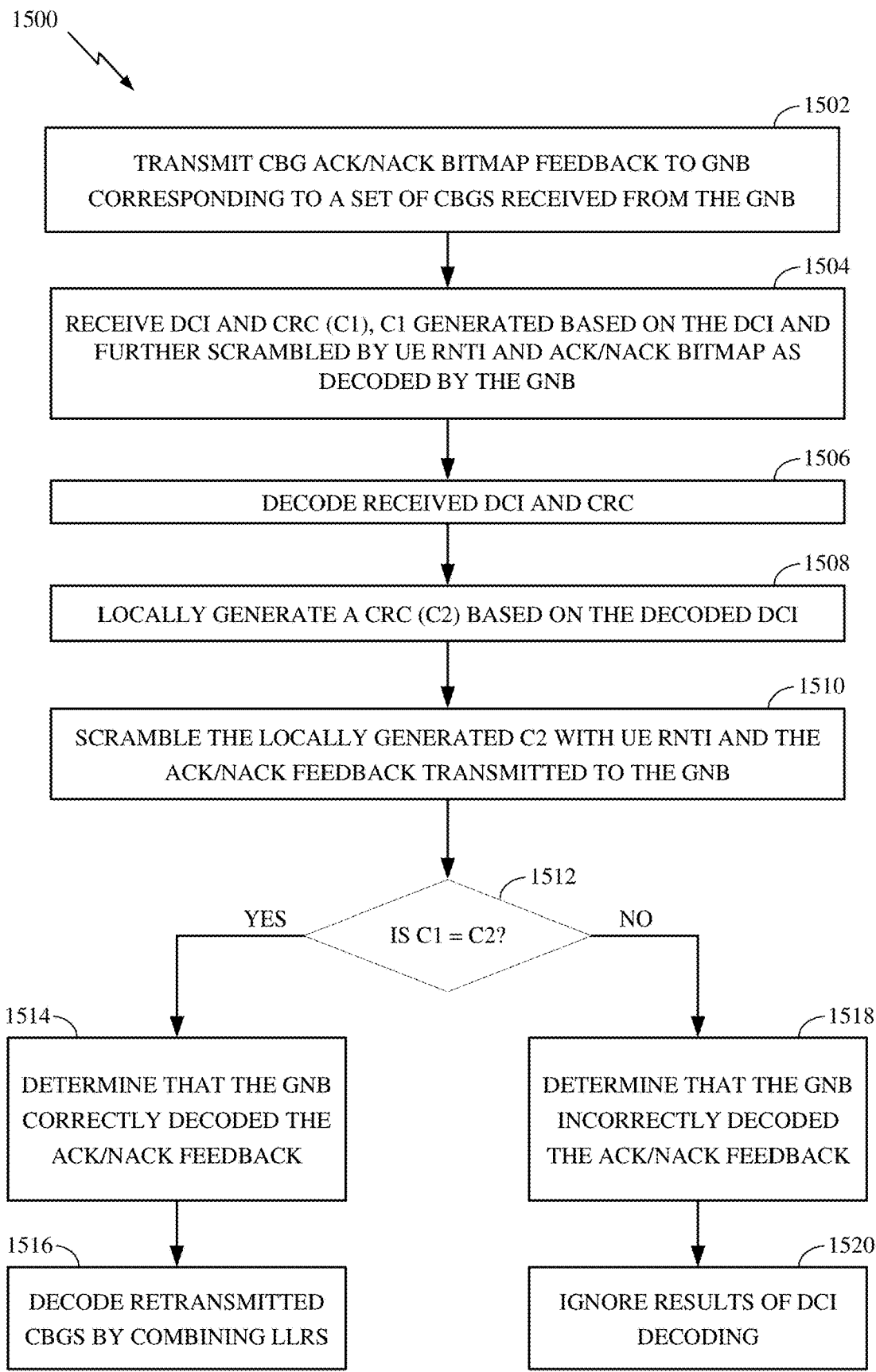
FIG. 15 illustrates example operations by a UE for a second technique of using embedded CBG ACK/NACK pattern in DCI to process retransmitted CBGs, according to some aspects of the disclosure.

FIG. 15 illustrates example operations 1500 by a UE, for a second technique of using embedded CBG ACK/NACK pattern in DCI to process retransmitted CBGs, in accordance with certain aspects of the present disclosure. At 1502, the UE transmits CBG feedback (e.g., an ACK/NACK bitmap) to the BS corresponding to a set of CBGs received from the BS. At 1504, the UE receives DCI (e.g., scheduling retransmission of CBGs) and a CRC (C1). C1 is generated based on the DCI and further scrambled by UE RNTI and an ACK/NACK bitmap as decoded by the BS. At 1506, the UE decodes the received DCI and CRC. At 1508, the UE locally generates another CRC (C2) based on the decoded DCI. At 1510, the UE scrambles the locally generated C2 with the UE RNTI and the ACK/NACK bitmap transmitted to the BS. At 1512, the UE compares the locally generated C2 with the received C1. If the CRCs match (i.e., the CRCs are the same), the UE determines that the ACK/NACK feedback was correctly decoded by the BS at 1514 and proceeds to decode one or more retransmitted CBGs by proper soft combining at 1516. If the CRCs do not match, the UE determines that the ACK/NACK feedback was incorrectly decoded by the BS at 1518 and may ignore the results of the DCI decoding at 1520.

Figure 16:
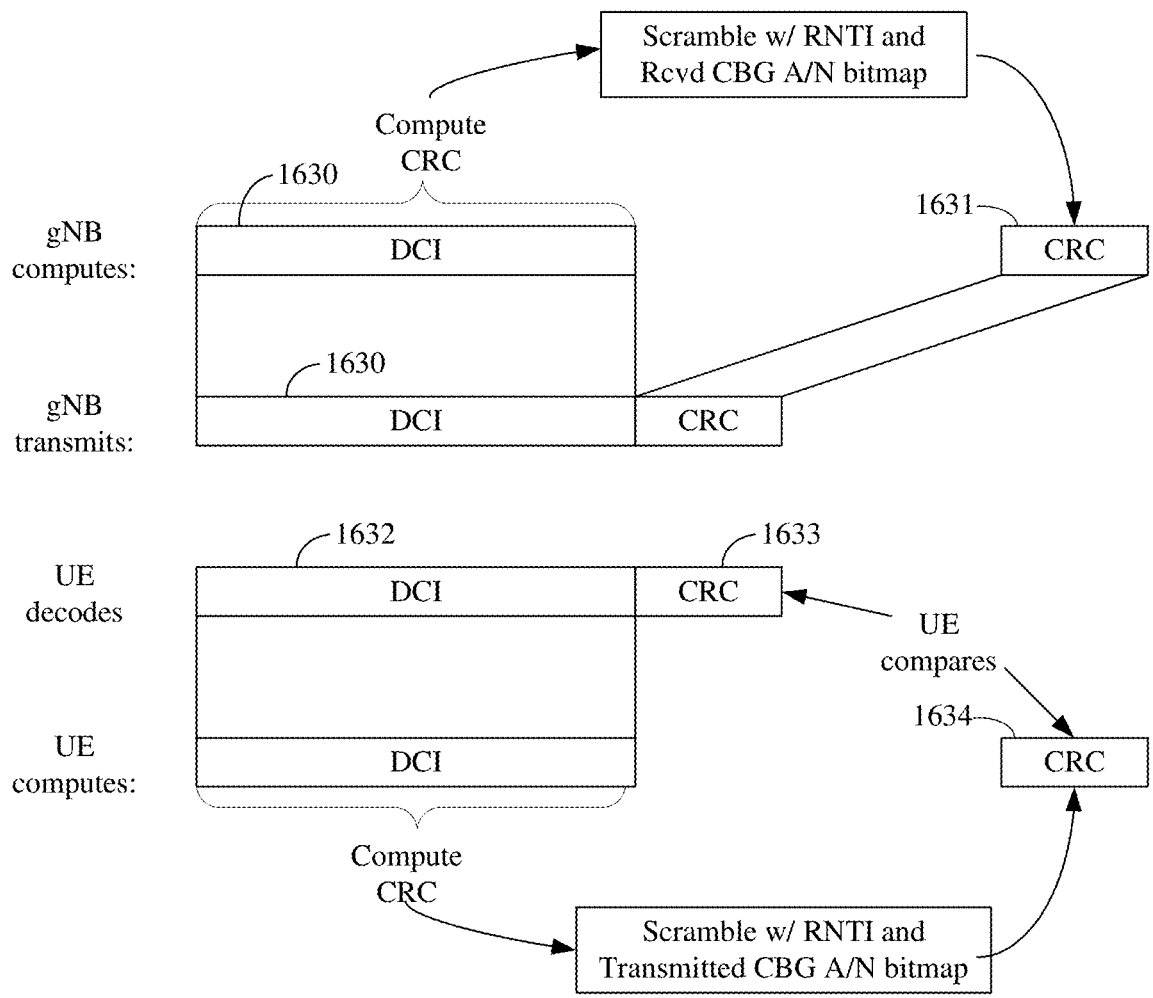
FIG. 16 illustrates the second technique for embedding decoded CBG ACK/NACK pattern in a DCI by a BS for use in retransmitting one or more CBGs, according to some aspects of the disclosure.

FIG. 16 illustrates the second technique for embedding decoded CBG ACK/NACK pattern in a DCI CRC by a BS for use in retransmitting one or more CBGs, in accordance with certain aspects of the present disclosure. As shown in FIG. 16, the BS generates a DCI 1630 and generates a CRC 1631 based on the DCI. The BS then scrambles the CRC with an identity of the UE (e.g., RNTI) and further scrambles the CRC with a CBG ACK/NACK bitmap (or a function or sequence thereof) as decoded by the BS. As shown, the BS transmits the DCI 1630 and the scrambled CRC 1631 to the UE.

The UE decodes the received DCI 1632 and the CRC 1633. The UE locally generates a CRC 1634 with the decoded DCI 1632 and then scrambles the generated CRC with the identity of the UE (e.g., RNTI) and the CBG ACK/NACK bitmap transmitted to the BS. The UE compares the locally generated and scrambled CRC 1634 with the CRC 1633 received from the BS. As noted above, if the CRCs match, the UE proceeds with decoding the retransmitted CBGs. If the CRCs do not match, the UE may ignore the results of decoding the DCI. In certain aspects of the disclosure, there are different ways to scramble the CBG ACK/NACK bitmap on the CRC. If CBG ACK/NACK bitmap is no longer than the CRC length, a straightforward way is direct scramble. On the other hand, if CBG ACK/NACK bitmap is longer, some kind of hashing may be performed.

Figure 17:
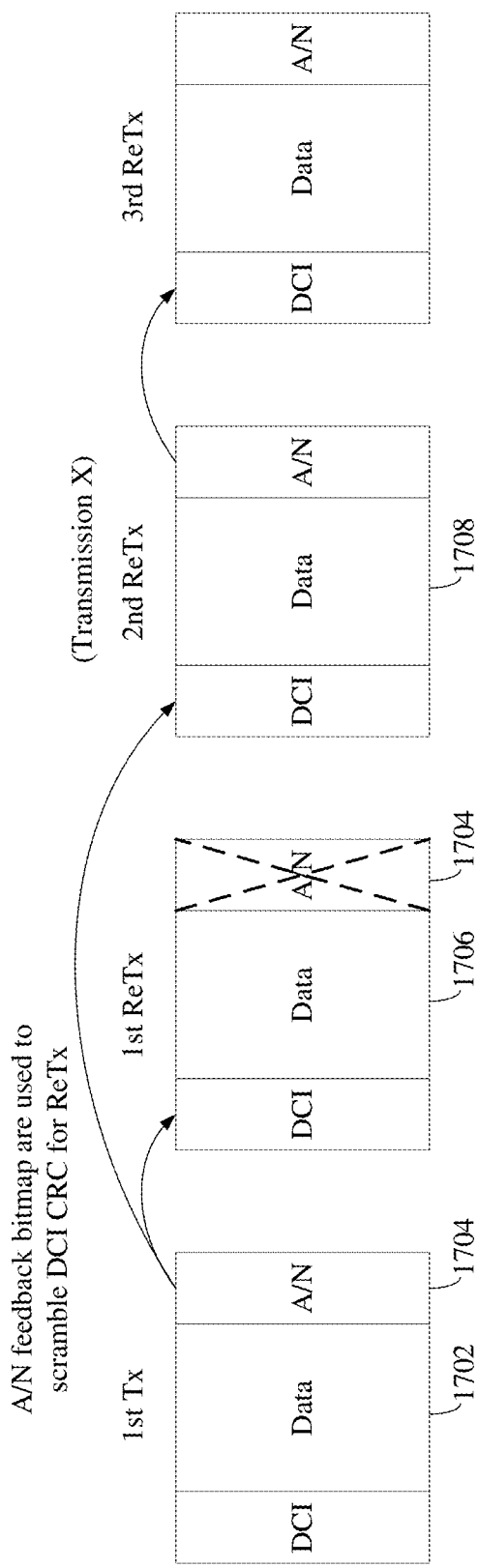
FIG. 17 illustrates an exemplary error event during the decoding and/or reception of CBG feedback by a BS.

FIG. 17 illustrates an exemplary error event during the decoding and/or reception of CBG feedback by a BS in accordance with certain aspects of the present disclosure. For example, in a first slot, a UE may receive 10 CBGs in a first transmission 1702 ($1^{st}$ Tx in FIG. 17) and transmit a CBG A/N bitmap 1704 that contains 10 bits (e.g., a0 . . . a9). The slot may be a DL-centric slot similar to one shown in FIG. 3. Each bit of the A/N bitmap 1704 indicates the ACK or NACK status for one corresponding CBG (e.g., '1' means ACK and '0' means NACK). In one example, the first transmission may include 100 CBs that are grouped into 10 CBGs with 10 CBs in each CBG. If UE fails to receive and/or decode, for example, CBG0, CBG1, and CBG2, the UE may report 0001111111 as the A/N bitmap.

If the BS detects the A/N bitmap 1704 correctly, in the second transmission 1706 ($1^{st}$ ReTx in FIG. 17), the BS may transmit the CBs (e.g., CB0 to CB29) corresponding to CBG0, CBG1, and CBG2, in a second slot. In the $1^{st}$ ReTx 1706, the CBs may be grouped into 10 CBGs again, now with 3 CBs in each CBG. That is, the $1^{st}$ Tx and $1^{st}$ ReTx have different CBGs. The DCI grant for the $1^{st}$ ReTx uses the A/N bitmap 1704 (0001111111) for scrambling the CRC. At the UE, when decoding the DCI of the $1^{st}$ ReTx, the UE uses bitmap 0001111111 for descrambling as well. For example, the UE uses the bitmap 0001111111 to scramble a locally generated CRC that is compared with the CRC received from the BS. Because both sides use the same bitmap (or a sequence based on the same bitmap) for scrambling the respective CRCs, the DCI may be identified reliably.

Unreliable CBG Level ACK/NACK Feedback

In the $1^{st}$ ReTx (second slot), if the UE fails to receive and/or decode, for example, CBG 2, CBG3, and CBG4, the UE reports 1100011111 as the A/N bitmap. In one example, the BS may detect the A/N bitmap incorrectly and decode the A/N bitmap as 0000011111 (i.e., CBG 0/1/2/3/4 have an error). In the third transmission 1708 ($2^{nd}$ ReTx in FIG. 17), the BS transmits the CBs (e.g., CB0 to CB14) corresponding to CBG 0/1/2/3/4 in the $2^{nd}$ ReTx, during a third slot. The CBs transmitted may be regrouped into 10 CBG again (e.g., 5 CBGs each containing 2 CBs and 5 CBGs each containing 1 CB). Therefore, it is possible that both the $1^{st}$ ReTx and $2^{nd}$ ReTx result in the same A/N bitmap due to CBG regrouping. In this case, the UE may not be able to determine if the transmission is the $2^{nd}$ ReTx based on the A/N bitmap of the $1^{st}$ ReTx, or if the BS failed to receive the A/N bitmap of the $1^{st}$ ReTx and retransmits the $1^{st}$ ReTx again.

In some aspects of the present disclosure, unreliable CBG level A/N feedback may be detected using a sequence of concatenated CBG A/N bitmaps to scramble the DCI (e.g., CRC based on the DCI). A BS may concatenate or combine CBG A/N bitmaps or patterns that are received in previous slots to scramble the following DCI transmission in a current slot. The scrambling may be applied to the entire coded bit transmission or only the CRC of the control message (e.g., DCI). In some examples, the BS may directly use the concatenated bitmaps to scramble the coded bits. In some examples, the BS may use the concatenated bitmaps as a seed to generate a random sequence, and then use the random sequence to scramble the coded bits or CRC.

Figure 18:
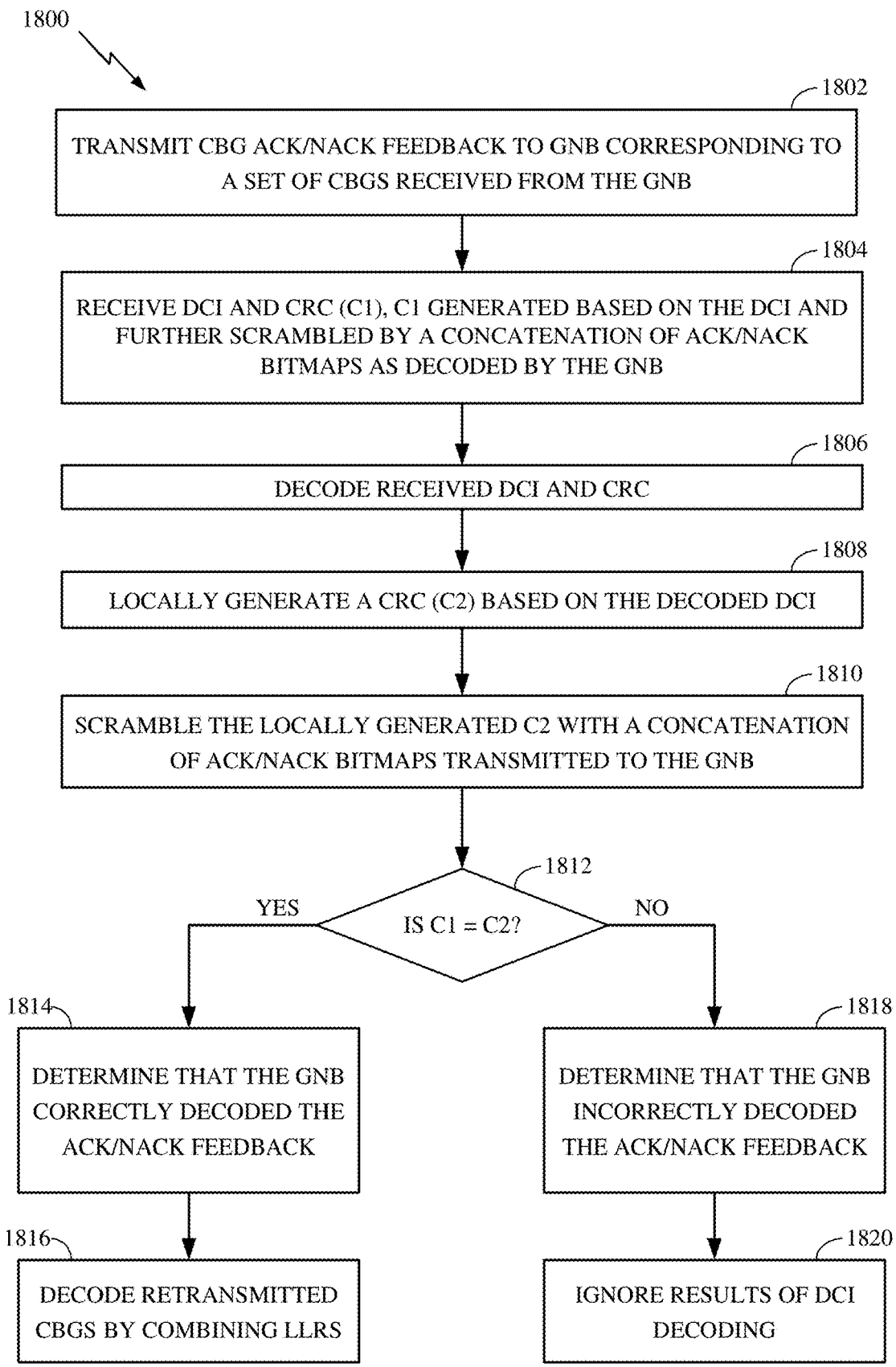
FIG. 18 illustrates exemplary operations for using concatenated CBG ACK/NACK patterns to scramble DCI transmissions when retransmitting one or more CBGs, according to some aspects of the disclosure.

FIG. 18 illustrates exemplary operations 1800 for using concatenated CBG ACK/NACK patterns to scramble DCI transmissions when retransmitting one or more CBGs, in accordance with certain aspects of the present disclosure. Operations 1800 may be performed by any of the UEs or scheduled entities illustrated in FIGS. 1, 2, 5, 9, and 10. At 1802, the UE transmits CBG feedback (e.g., A/N bitmap) to the BS corresponding to a set of CBGs received from the BS. For example, referring to FIG. 19, in a first slot, the UE receives a first transmission ($1^{st}$ Tx) including a first set of CBGs 1902 and transmits a first A/N bitmap 1904. In a second slot ($1^{st}$ ReTx), the UE receives a second set of CBGs 1906 and transmits a second A/N bitmap 1908. In a third slot ($2^{nd}$ ReTx), the UE receives a third set of CBGs 1910 and transmits a third A/N bitmap 1912. In a fourth slot ($3^{rd}$ ReTx), the UE receives a fourth set of CBGs 1914 and transmits a fourth A/N bitmap 1916.

Figure 19:
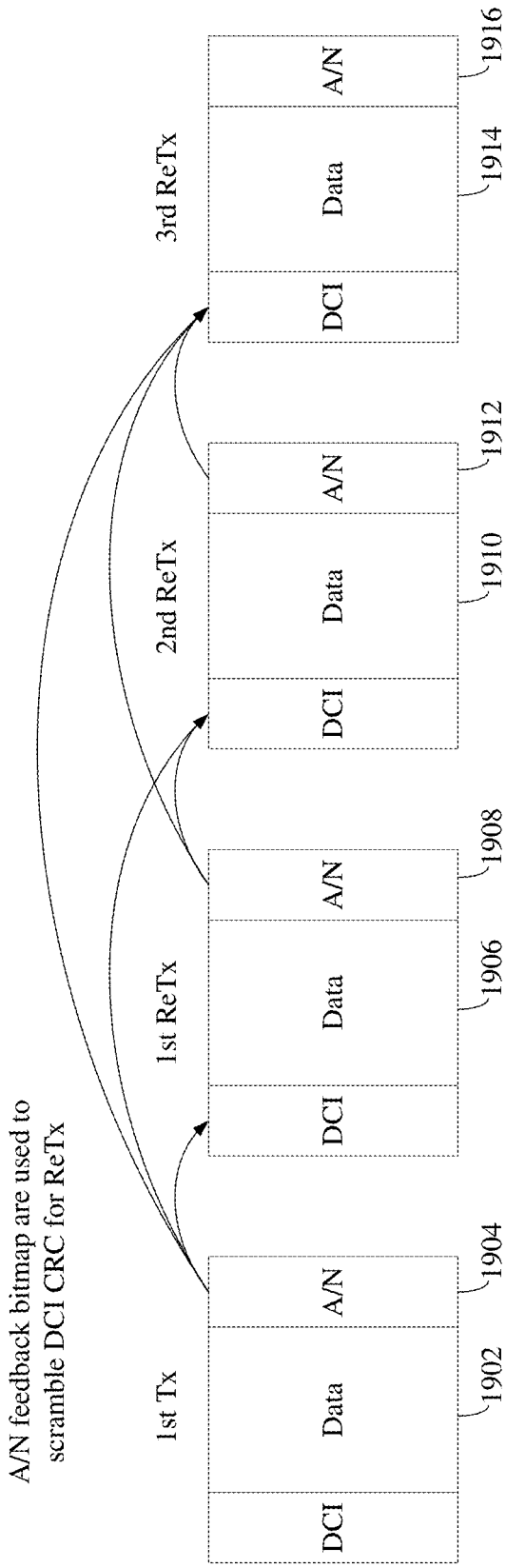
FIG. 19 illustrates exemplary CBGs retransmissions using concatenated CBG ACK/NACK patterns to scramble DCI, according to some aspects of the disclosure.

Referring back to FIG. 18, at 1804, the UE receives DCI (e.g., scheduling retransmission of CBGs) and a CRC (C1). C1 is generated based on the DCI and further scrambled by a concatenation of A/N bitmaps as received and decoded by the BS. For example, referring to FIG. 19, in $2^{nd}$ ReTx and $3^{rd}$ ReTx, the BS generates a CRC based on the DCI and then scrambles it with a concatenation of A/N bitmaps previously decoded by the BS. In the $2^{nd}$ ReTx, the CRC is scrambled by a sequence including a concatenation of the first A/N bitmap 1904 and second A/N bitmap 1908. In the $3^{rd}$ ReTx, the CRC is scrambled by a sequence including a concatenation of the first A/N bitmap 1904, second A/N bitmap 1908, and third A/N bitmap 1912. While only three CBG level retransmissions are illustrated in FIG. 19, the concept of scrambling the DCI/CRC using concatenated A/N bitmaps can be extended to any number of retransmissions.

Referring back to FIG. 18, at 1806, the UE decodes the received DCI and CRC. At 1808, the UE locally generates another CRC (C2) based on the decoded DCI. At 1810, the UE scrambles the locally generated C2 with a concatenation of A/N bitmaps previously transmitted to the BS. For example, if the DCI corresponds to the $3^{rd}$ ReTx, the concatenation of A/N bitmaps includes the first A/N bitmap 1904, second A/N bitmap 1908, and third A/N bitmap 1912.

At 1812, the UE compares the locally generated C2 with the received C1. If the CRCs match (e.g., the CRCs are the same), the UE determines that the CBG feedback was correctly decoded by the BS at 1814 and proceeds to decode one or more retransmitted CBGs by proper soft combining at 1816. If the CRCs do not match, the UE determines that the CBG feedback was incorrectly decoded by the BS at 1818 and may ignore the results of the DCI decoding at 1820.

Examples of Detecting A/N Feedback Errors Using Concatenated A/N Bitmaps

Referring to FIG. 19, for example, the BS receives an A/N bitmap 0001111111 for the first transmission ($1^{st}$ Tx) in a first slot, and an A/N bitmap 0000011111 for the $1^{st}$ ReTx in a second slot. Then, in a third slot ($2^{nd}$ ReTx), the BS may scramble the DCI grant (e.g., CRC) using the concatenated A/N bitmaps 0001111111 and 0000011111. Similarly, in a fourth slot ($3^{rd}$ ReTx), the BS may use the concatenated A/N bitmaps of the $1^{st}$ Tx, $1^{st}$ ReTx, and $2^{nd}$ ReTx for scrambling the CRC of the $3^{rd}$ ReTx. At the UE, when decoding the DCI grant of the $2^{nd}$ ReTx, the UE uses the concatenated A/N bitmaps 0001111111 and 1100011111 for descrambling the CRC or coded bits. If there is an A/N error of the $1^{st}$ ReTx, different concatenated A/N bitmaps are used by the UE and BS for scrambling the DCI (e.g., CRC) of the $2^{nd}$ ReTX. In that case, the DCI of the $2^{nd}$ ReTx cannot be identified (i.e., invalid) by the UE. Using the concatenated A/N bitmaps, the UE can determine whether the A/N feedback of the $1^{st}$ ReTx is successfully received and/or decoded by the BS. Starting from the third transmission ($2^{nd}$ ReTx), the packet may be considered lost. The BS may figure out this situation, for example, by seeing that there is no response to the DCI grant after a predetermined time period and may try a TB level retransmission later.

In another aspect of the disclosure, the UE may fail to receive or decode the DCI of the $1^{st}$ ReTx. This condition may be called a grant erasure event. Therefore, from the UE's perception, the $1^{st}$ ReTx did not occur, and therefore the UE does not transmit A/N feedback. In the third transmission ($2^{nd}$ ReTx), the BS retransmits the $1^{st}$ ReTx. For example, the BS may retransmit the CBs corresponding to CBG 0/1/2 in the first transmission. The DCI grant for this transmission still uses the same A/N bitmap 0001111111 of the $1^{st}$ Tx for scrambling the CRC. At the UE side, when decoding the DCI grant of the $2^{nd}$ ReTx, the UE uses the same bitmap 0001111111 for scrambling the locally generated CRC as well. Because both sides use the same sequence for scrambling the CRC, the DCI can be identified and validated. If the UE successfully decodes the CBGs, UE reports 1111111111 as the A/N feedback bitmap. Then, if the BS detects the A/N feedback correctly, data transmission is completed for the CBGs.

In another aspect of the disclosure, in the $1^{st}$ ReTx, if the UE fails to receive and/or decode CBG 2, CBG3, and CBG4, the UE reports A/N bitmap 1100011111 as the A/N feedback bitmap. The BS does not detect the A/N feedback at all and assumes that the $1^{st}$ ReTx including the DCI is not received by the UE. This event may be called an A/N erasure event. In the $3^{rd}$ transmission ($2^{nd}$ ReTx), the BS retransmits the $1^{st}$ ReTx. For example, the gNB may still transmit the CBs corresponding to CBG 0/1/2 in the first transmission. The BS scrambles the DCI grant or CRC for this transmission using the A/N bitmap 0001111111. At the UE side, when decoding the DCI of the $2^{nd}$ ReTx, the UE uses concatenated A/N bitmaps 0001111111 and 1100011111 for scrambling a locally generated CRC that is compared to the CRC received from the BS. Because different sequences are used for scrambling the CRCs, the CRCs are different, and the UE cannot identify the DCI. In that case, starting from the $2^{nd}$ ReTx, the packet may be considered lost. The BS may detect this situation, for example, by determining that there is no response to the DCI grant. In some examples, the BS may try a TB level retransmission later.

In another aspect of the disclosure, in the $2^{nd}$ transmission ($1^{st}$ ReTx), the BS transmits the CBs (e.g., CB0 to CB29) corresponding to CBG 0/1/2 in the $1^{st}$ transmission. The CBs may be grouped into 10 CBGs again, now with 3 CBs in each CBG. The BS uses the A/N bitmap 0001111111 for scrambling the DCI grant or CRC for the $1^{st}$ ReTx. At the UE side, when decoding the DCI grant, the UE uses the same bitmap 0001111111 for descramble (e.g., scrambling a locally generated CRC that is compared to the CRC received from the BS) as well. Because both sides use the same sequence for scrambling the CRC, the DCI of $1^{st}$ ReTx can be identified.

If the UE fails to decode CBG0, CBG1, and CBG2 in the $1^{st}$ ReTx, the UE reports 0001111111 in the A/N bitmap. This CBG feedback happens to be exactly the same as the previous report for the first transmission, but for different CBs. If the BS does not detect the A/N feedback of the $1^{st}$ ReTx, the BS assumes the $1^{st}$ ReTx DCI is not received by the UE. Therefore, in the third transmission ($2^{nd}$ ReTx), the BS retransmits the $1^{st}$ ReTx that includes CB0 to CB29 corresponding to CBG 0/1/2 in the first transmission. The DCI grant for this transmission still uses A/N bitmap 0001111111 for scrambling the CRC. At the UE side, when decoding the DCI, the UE uses concatenated A/N bitmaps 0001111111 and 0001111111 for descrambling the CRC. Because the BS and UE use different sequences for scrambling the CRC, the DCI cannot be identified or validated. Therefore, starting from the third transmission ($2^{nd}$ ReTx), the packet may be considered lost. The BS may detect this situation, for example, by determining there is no response to the grant and may try a TB level retransmission later.

Descrambling DCI Using Different A/N Bitmaps

Figure 20:
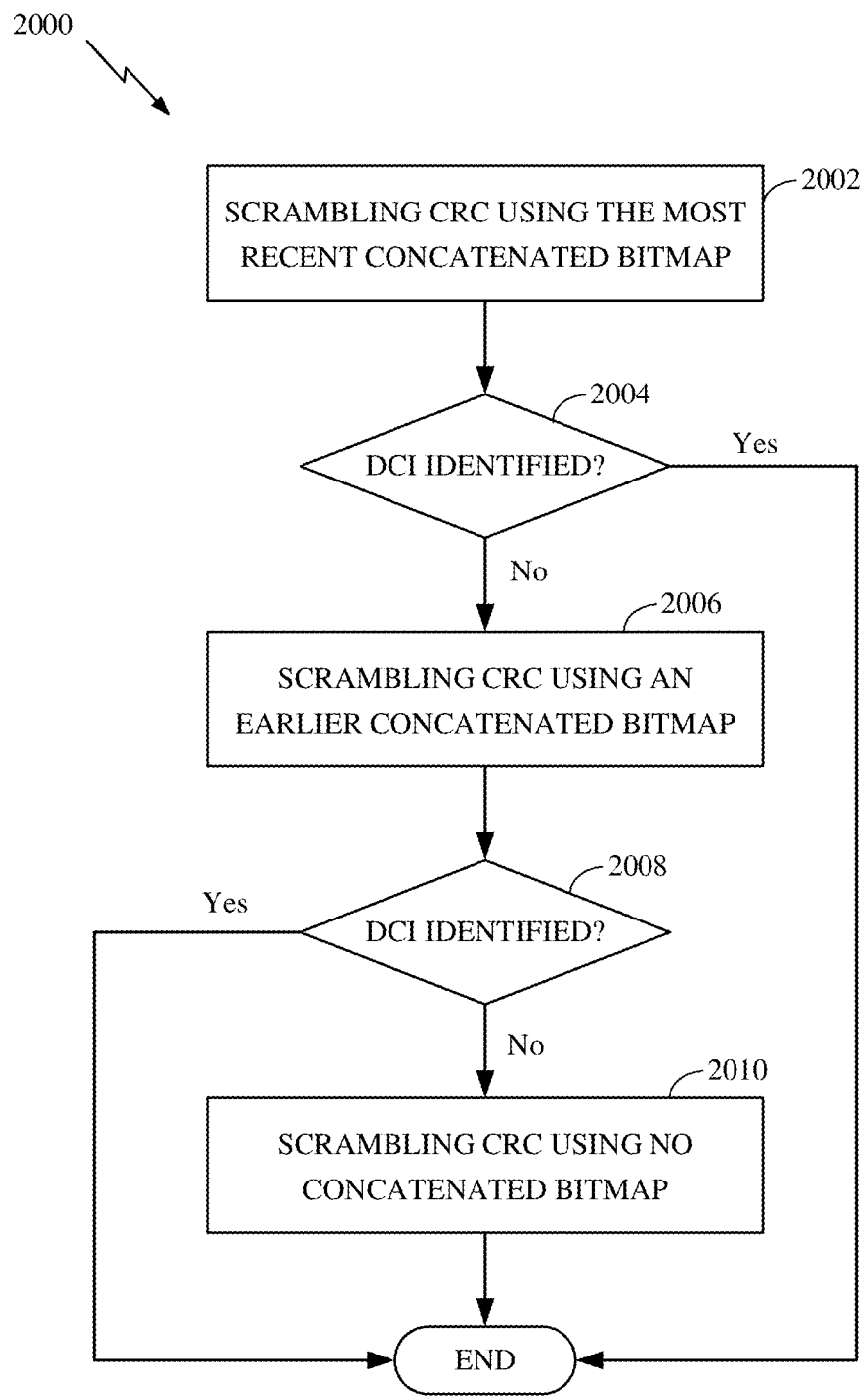
FIG. 20 illustrates exemplary operations for using multiple concatenated CBG ACK/NACK patterns to identify DCI, according to some aspects of the disclosure.

FIG. 20 illustrates exemplary operations 2000 for using multiple concatenated CBG ACK/NACK patterns or bitmaps to identify DCI, in accordance with certain aspects of the present disclosure. The operations may be performed a UE or scheduled entity illustrated in any of FIGS. 1, 2, 5, 9, and 10. The UE may try different concatenated CBG A/N bitmap combinations for identifying the DCI. At 2002, the UE may try scrambling the CRC using the most recent concatenated bitmap. At 2004, if the UE identifies the DCI (yes branch of block 2004), the operations may stop. At 2006, if the UE does not identify the DCI (no branch of block 2004), the UE may try scrambling the CRC using an earlier concatenated bitmap. For example, referring to FIG. 19, the most recent concatenated bitmap may include the A/N bitmap 1904, A/N bitmap 1908, and A/N bitmap 1912, when the UE tries to identify the DCI of the $3^{rd}$ ReTx. Then the earlier concatenated bitmap may include the A/N bitmap 1904 and A/N bitmap 1908, because the A/N bitmap 1912 may be missing (i.e., not received by the BS).

At 2008, if the UE identifies the DCI (yes branch of block 2008), the operations may stop. If the UE still does not identify the DCI (no branch of block 2008), the UE, at 2010, may not scramble the CRC using any concatenated A/N bitmap in case the BS decided to retransmit the whole TB. The UE needs no extra scrambling with A/N bitmaps when the BS falls back to TB level retransmission. This will be the case for the initial transmission as well. The UE may use the latest concatenated bitmap to cover the case where the previous A/N bitmaps are correctly received. The UE may use a previous concatenated bitmap to cover the case where the recent A/N bitmap was not correctly received.

In an illustrative example, referring to FIG. 19, the BS does not detect the A/N feedback 1908 of the $1^{st}$ ReTx and assumes the $1^{st}$ ReTx is not received by the UE. Therefore, in the $2^{nd}$ ReTx, the BS retransmits the $1^{st}$ ReTx that includes the CBs (e.g., CB0 to CB29) corresponding to CBG 0/1/2 that are not successfully received in $1^{st}$ transmission. The DCI grant for the $2^{nd}$ ReTx uses A/N bitmap 0001111111 for scrambling the CRC. At the UE side, when decoding the DCI grant of the $2^{nd}$ ReTx, the UE uses concatenated bitmaps 0001111111 and 1100011111 for descrambling. In addition, the UE may try using the previous bitmap 0001111111 for descrambling (e.g., scrambling a locally generated CRC and compared it with the received CRC). In this case, the previous bitmap (0001111111) will match the transmitter side scrambling bitmap, and the UE realizes that the previous A/N feedback was erased (not received and/or decoded by the BS). Therefore, the UE may retry the decoding for the previously NACK'ed CBs (e.g., CB6 to CB14) in the transmission, though CB0 to CB29 are included (remaining already decoded). If decoding is successful, the UE sends ACK for all CBGs, and transmission may end.

Figure 21:
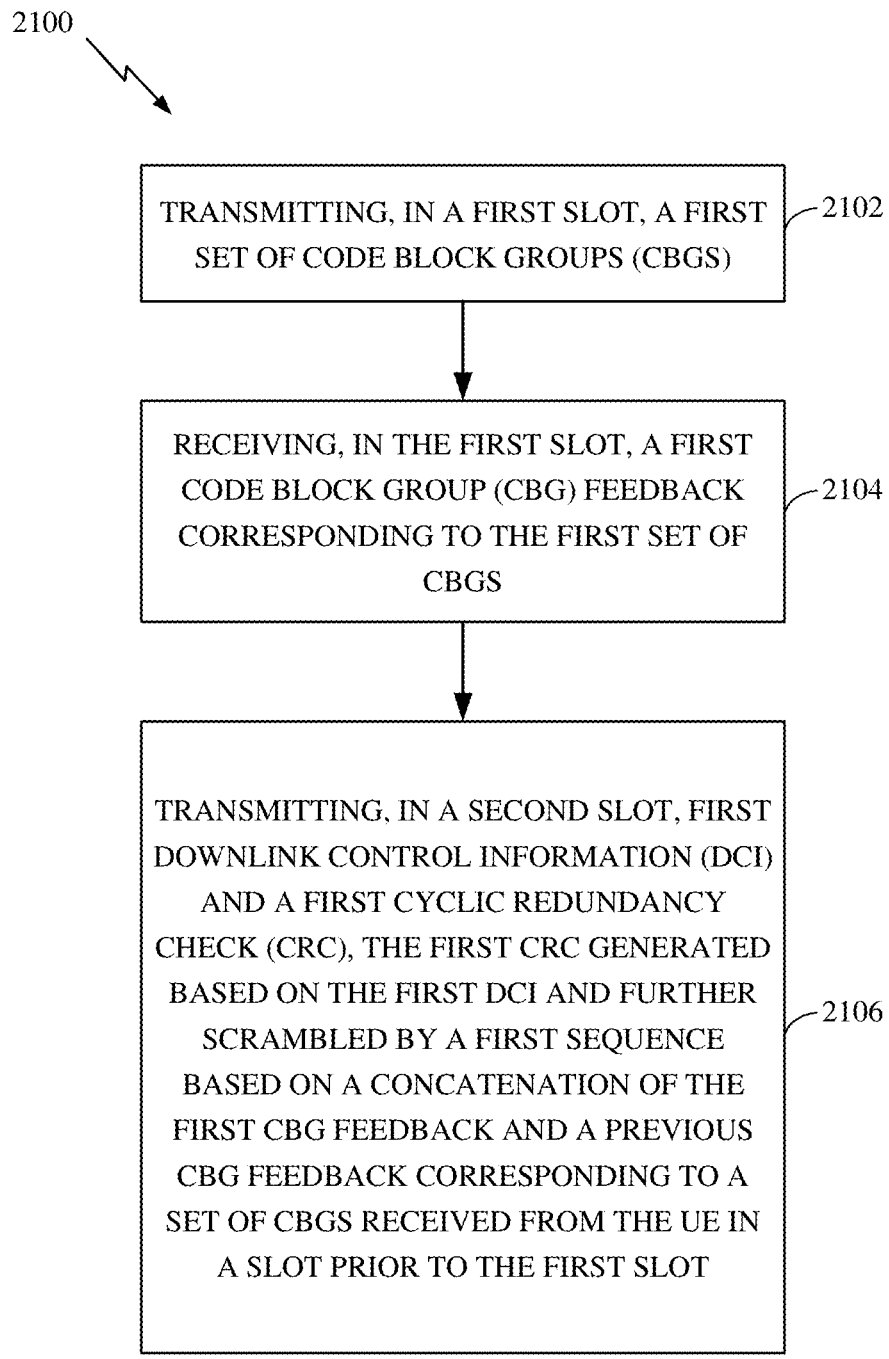
FIG. 21 illustrates exemplary operations for using concatenated CBG ACK/NACK patterns to scramble CRC when retransmitting one or more CBGs, according to some aspects of the disclosure.

FIG. 21 illustrates exemplary operations 2100 for using concatenated CBG ACK/NACK patterns to scramble CRC when retransmitting one or more CBGs, in accordance with certain aspects of the present disclosure. Operations 2100 may be performed by any of the base stations or scheduling entities illustrated in FIGS. 1, 2, 4, 9 and/or 10.

At 2102, a scheduling entity (e.g., gNB) transmits, in a first slot, a first set of code block groups (CBGs) to a UE. In one example, the first set of CBGs may be the CBGs corresponding to the $1^{st}$ ReTx illustrated in FIG. 19. At 2104, the scheduling entity receives, in the first slot, a first CBG feedback corresponding to the first set of CBGs. In one example, the first CBG feedback may be the A/N bitmap 1908 of FIG. 19 as decoded by the BS. At 2106, the scheduling entity transmits, in a second slot, a first DCI and a first CRC. The first CRC is generated based on the first DCI and further scrambled by a first sequence based on a concatenation of the first CBG feedback and a previous CBG feedback corresponding to a set of CBGs received from the UE in a slot prior to the first slot. In one example, the first DCI may be the DCI of the $2^{nd}$ ReTx illustrated in FIG. 19, and the previous CBG feedback may be the A/N bitmap 1904 as decoded by the BS. As described above in relation to FIGS. 18-20, the UE may identify the DCI using a locally generated CRC based on the DCI and further scrambled by a concatenation of A/N bitmaps transmitted by the UE.

In some aspects of the disclosure, when forming the concatenation of bitmaps for scrambling the CRC, the UE may drop the all-NACK bitmap. It is because as long as both the UE and BS drop the all-NACK bitmap in the concatenation, there will be no confusion in A/N status. Moreover, the TB level NACK in the beginning of the set of retransmissions may also be dropped. The erasure of such A/N feedback is not a problem as it will not change the common understanding between the BS and UE what CBs are delivered.

In certain aspects of the disclosure, the BS may know the reason for a failed decoding at the UE of one or more CBGs transmitted to the UE. For example, when eMBB (enhanced Mobile Broadband) and URLL (Ultra-Reliable and Low Latency Communications) coexist, the BS may puncture some resources assigned for the PDSCH of an eMBB UE to serve a URLLC UE. In such a case, many samples of CBGs are punctured leading to failed reception of the CBGs at the UE. Thus, the LLRs collected for many bits corresponding to the failed CBGs are not valid. Further soft combining with LLRs from a retransmission of the failed CBGs may not be helpful. Thus, in certain aspects, the UE may erase the wrongly collected LLRs (e.g., due to the puncturing) and start LLR collection afresh. However, the UE does not know that the LLRs corresponding to certain CBGs received at the UE are bad.

In certain aspects, the BS may include an indicator to the UE to stop soft combining of LLRs corresponding to one or more CBGs in the retransmission grant. In an aspect, the BS knows beforehand that LLRs corresponding to the one or more CBGs are bad due to puncturing of resources used to transmit the CBGs.

In certain aspects of the disclosure, in CBG based retransmission, the DCI may include a bit (e.g., an LLR reset indicator) to indicate to the UE that the LLR combination may be stopped for one or more CBGs received by the UE. In an aspect of the disclosure, an NDI (New Data Indicator) bit used in LTE may be reinterpreted as an indicator for an LLR reset. In response, the UE may abandon the collected LLRs for the one or more CBGs in the retransmission and start LLR collection afresh. This technique may be used when the BS knows that some or all the CBGs in the retransmission were damaged by puncturing in a previous transmission and invalid LLR values were collected by the UE.

In certain aspects, for CBG based retransmission or any retransmission, by definition the NDI bit may not be defined and/or used in NR. So, the NDI bit may be used in NR to send the LLR reset indicator. In this way, the DCI length of an initial grant and a retransmission grant may be the same. This technique assumes that the UE is able to recognize a CBG based retransmission. In an aspect of the disclosure, this design works with CBG ACK/NACK embedded in CRC.

In one configuration, the apparatus 400 and/or 500 for wireless communication includes means for various functions including DCI decoding using a concatenation of CBG A/N patterns. In one aspect, the aforementioned means may be the processor(s) 404/504 shown in FIG. 4/5 configured to perform the functions recited by the aforementioned means. In another aspect, the aforementioned means may be a circuit or any apparatus configured to perform the functions recited by the aforementioned means.

Of course, in the above examples, the circuitry included in the processor 404/504 is merely provided as an example, and other means for carrying out the described functions may be included within various aspects of the present disclosure, including but not limited to the instructions stored in the computer-readable storage medium 406/506, or any other suitable apparatus or means described in any one of the FIGS. 1, 2, 4, 5, 9, and/or 10, and utilizing, for example, the processes and/or algorithms described herein in relation to FIGS. 6-21.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-21 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication operable at a scheduling entity, comprising:
   transmitting, in a first slot, a first set of code block groups (CBGs) to a user equipment (UE);
   receiving, in the first slot, a first code block group (CBG) feedback corresponding to the first set of CBGs; and
   transmitting, in a second slot, first downlink control information (DCI) and a first cyclic redundancy check (CRC), the first CRC generated based on the first DCI and further scrambled by a first sequence, the first sequence based on a concatenation of the first CBG feedback and a previous CBG feedback corresponding to a set of CBGs received from the UE in a slot prior to the first slot.

2. The method of claim 1, further comprising:
   generating the first sequence comprising a first bitmap of the first CBG feedback and a second bitmap of the previous CBG feedback; and
   scrambling the first CRC with the first sequence.

3. The method of claim 2, wherein generating the first sequence comprises:
   generating a seed based on the first bitmap and the second bitmap; and
   generating the first sequence as a random sequence based on the seed.

4. The method of claim 1, further comprising:
   transmitting, in the second slot, a second set of CBGs scheduled by the first DCI, the second set of CBGs including one or more CBGs of the first set of CBGs based on the first CBG feedback;
   receiving, in the second slot, a second CBG feedback corresponding to the second set of CBGs; and
   transmitting, in a third slot, second DCI and a second CRC, the second CRC generated based on the second DCI and further scrambled by a second sequence including a concatenation of the first CBG feedback, the previous CBG feedback, and the second CBG feedback.

5. The method of claim 4, further comprising:
   transmitting, in the third slot, a third set of CBGs scheduled by the second DCI, the third set of CBGs including one or more CBGs of the second set of CBGs based on the second CBG feedback; and if no CBG feedback is received for the third set of CBGs, retransmitting a transport block including the first set of CBGs.

6. A scheduling entity, comprising:
a communication interface configured for wireless communication;
a memory; and
a processor operatively coupled with the communication interface and the memory,
wherein the processor and the memory are configured to:
transmit, in a first slot, a first set of code block groups (CBGs) to a user equipment (UE);
receive, in the first slot, a first code block group (CBG) feedback corresponding to the first set of CBGs; and
transmit, in a second slot, first downlink control information (DCI) and a first cyclic redundancy check (CRC), the first CRC generated based on the first DCI and further scrambled by a first sequence, the first sequence based on a concatenation of the first CBG feedback and a previous CBG feedback feedback corresponding to a set of CBGs received from the UE in a slot prior to the first slot.

7. The scheduling entity of claim 6, wherein the processor and the memory are further configured to:
generate the first sequence comprising a first bitmap of the first CBG feedback and a second bitmap of the previous CBG feedback; and
scramble the first CRC with the first sequence.

8. The scheduling entity of claim 7, wherein the processor and the memory are further configured to generate the first sequence, by:
generating a seed based on the first bitmap and the second bitmap; and
generating the first sequence as a random sequence based on the seed.

9. The scheduling entity of claim 6, wherein the processor and the memory are further configured to:
transmit, in the second slot, a second set of CBGs scheduled by the first DCI, the second set of CBGs including one or more CBGs of the first set of CBGs based on the first CBG feedback;
receive, in the second slot, a second CBG feedback corresponding to the second set of CBGs; and
transmit, in a third slot, second DCI and a second CRC, the second CRC generated based on the second DCI and further scrambled by a second sequence including a concatenation of the first CBG feedback, the previous CBG feedback, and the second CBG feedback.

10. The scheduling entity of claim 9, wherein the processor and the memory are further configured to:
transmit, in the third slot, a third set of CBGs scheduled by the second DCI, the third set of CBGs including one or more CBGs of the second set of CBGs based on the second CBG feedback; and
if no CBG feedback is received for the third set of CBGs, retransmit a transport block including the first set of CBGs.

* * * * *